(12) United States Patent
Slaton et al.

(10) Patent No.: US 9,828,925 B2
(45) Date of Patent: Nov. 28, 2017

(54) HIERARCHICAL VEHICLE DE-RATE AND NOTIFICATION SYSTEM

(71) Applicants: Zachary Slaton, Seattle, WA (US); Brett Alan Grothen, Woodinville, WA (US)

(72) Inventors: Zachary Slaton, Seattle, WA (US); Brett Alan Grothen, Woodinville, WA (US)

(73) Assignee: PACCAR Inc, Bellevue, WA (US)

( * ) Notice: Subject to any disclaimer, the term of this patent is extended or adjusted under 35 U.S.C. 154(b) by 660 days.

(21) Appl. No.: 13/802,515

(22) Filed: Mar. 13, 2013

(65) Prior Publication Data

US 2014/0277995 A1    Sep. 18, 2014

(51) Int. Cl.
  *F02D 41/22* (2006.01)
  *F01N 11/00* (2006.01)
  *B60W 50/029* (2012.01)
  *B60W 50/14* (2012.01)
  *B60W 10/06* (2006.01)

(52) U.S. Cl.
  CPC ............. *F02D 41/22* (2013.01); *B60W 10/06* (2013.01); *B60W 50/029* (2013.01); *B60W 50/14* (2013.01); *F01N 11/00* (2013.01); *B60W 2050/0292* (2013.01); *B60W 2050/143* (2013.01); *B60W 2050/146* (2013.01); *F01N 2550/02* (2013.01); *F01N 2550/05* (2013.01); *F02D 2041/228* (2013.01); *F02D 2250/26* (2013.01); *Y02T 10/47* (2013.01)

(58) Field of Classification Search
  CPC .... F02D 2250/26; F02D 41/22–41/222; F02D 2041/223–2041/228; F02D 17/00–17/04
  USPC .............. 123/330–335, 198 D; 701/101–114
  See application file for complete search history.

(56) References Cited

U.S. PATENT DOCUMENTS

| | | | |
|---|---|---|---|
| 5,070,832 A | * | 12/1991 | Hapka .................... F01M 1/22 123/198 D |
| 6,405,818 B1 | | 6/2002 | Anthony et al. |
| 6,651,638 B1 | | 11/2003 | Oakes |

(Continued)

OTHER PUBLICATIONS

International Search Report and Written Opinion dated May 28, 2014, in International Patent Application No. PCT/US2014/017359, filed Feb. 20, 2014, 12 pages.

(Continued)

*Primary Examiner* — Erick Solis
*Assistant Examiner* — Robert Werner
(74) *Attorney, Agent, or Firm* — Christensen O'Connor Johnson Kindness PLLC

(57) ABSTRACT

An on-board vehicle computer system is configured to detect a condition of a vehicle; identify a de-rate cause for the vehicle in a hierarchical set of de-rate causes, wherein the de-rate cause is associated with the condition; select a de-rate type from a set of possible de-rate types based at least in part on the de-rate cause; select an initial de-rate level from a set of possible de-rate levels based at least in part on the de-rate cause; present an operator notification associated with the de-rate cause via an operator interface; activate a de-rate for the vehicle according to the de-rate type and the initial de-rate level; detect a change in the vehicle condition; and update the initial de-rate level based at least in part on the change in the vehicle condition.

22 Claims, 17 Drawing Sheets

(56) References Cited

U.S. PATENT DOCUMENTS

| | | | |
|---|---|---|---|
| 7,480,559 B2 * | 1/2009 | Groer | F01N 3/106 60/277 |
| 8,116,961 B2 * | 2/2012 | Bogema | F01N 3/208 60/286 |
| 8,806,853 B2 * | 8/2014 | Johnson | F01N 3/2073 60/274 |
| 8,869,607 B2 * | 10/2014 | Levijoki | F01N 3/208 73/114.75 |
| 2008/0162022 A1 | 7/2008 | Groer | |
| 2009/0000292 A1 | 1/2009 | Schifferer | |
| 2009/0192663 A1 | 7/2009 | Bennewitz | |
| 2009/0198402 A1 * | 8/2009 | Quigley | F01N 3/0238 701/31.4 |
| 2011/0271928 A1 | 11/2011 | Siciak | |
| 2012/0059560 A1 | 3/2012 | Balton | |

OTHER PUBLICATIONS

Slaton, Z., et al., "Flexible Maximum Vehicle Speed Method," U.S. Appl. No. 13/665,565, filed Oct. 31, 2012.
Extended European Search Report dated Sep. 26, 2016, issued in corresponding Application No. EP 14776341.1, filed Feb. 20, 2014, 7 pages.
Examination Report No. 1, dated Jan. 12, 2017, issued in Australian Application No. 2014242168, filed Feb. 20, 2014, 3 pages.

\* cited by examiner

1106

Limp Home Mode Maximum De-rate

920

Must Add Diesel Exhaust Fluid 1 of 1

1206

Diesel Exhaust Fluid Poor Quality

920

Replace with New DEF to Prevent De-rate 1 of 1

*1506* Power Reduced Due to SCR System Fault

*1330*

Seek Service to Repair SCR 1 of 1

*1606* Limp Home Mode Maximum De-rate

*920*

Must Replace Diesel Exhaust Fluid 1 of 1

HIERARCHICAL VEHICLE DE-RATE AND NOTIFICATION SYSTEM

BACKGROUND

A vehicle de-rate occurs when a reduction of available vehicle function is imposed on a vehicle without being requested by an operator. For example, an engine de-rate can be imposed (e.g., by electronic controls) on a vehicle in order to reduce engine speed or engine torque. A de-rate can be imposed on a vehicle in order to achieve a desired effect that stems from the de-rate, such as reduction of vehicle emissions.

U.S. Pat. No. 7,480,559 describes a method to operate an internal combustion engine having electronic control to detect emissions, compare the emissions to stored emissions at given engine speeds and torques, and de-rate the engine if the actual emissions are outside the range of calculated emissions for a given engine speed or torque; and a method to operate an electronic-controlled internal combustion engine to detect failures or impending failures in an emission system and de-rate engine speed or engine torque by an amount sufficient to reduce emissions levels to calibrated emissions levels and render an indication to an operator of the failure or impending failure.

However, prior systems have failed to provide a comprehensive treatment of possible de-rate causes and related information that can be communicated to operators.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one computer-implemented method described herein, a hierarchical set of possible de-rate causes is provided. A de-rate cause in the hierarchical set is identified, a de-rate type is selected based at least in part on the identified de-rate cause, an initial de-rate level is selected from a plurality of possible de-rate levels based at least in part on the identified de-rate cause, and a vehicle de-rate and notification process is initiated based at least in part on the de-rate type and the initial de-rate level.

In another computer-implemented method described herein, a condition of a vehicle is detected, and a de-rate cause is identified from a hierarchical set of de-rate causes. The de-rate cause is associated with the detected condition. A de-rate type is selected from a set of possible de-rate types based at least in part on the identified de-rate cause. An initial de-rate level also is selected from a set of possible vehicle de-rate levels based at least in part on the identified de-rate cause. An operator notification associated with the detected condition is presented via an operator interface on board the vehicle. A de-rate is imposed on the vehicle based at least in part on the de-rate type, the initial de-rate level, and a slew rate.

In another aspect, an on-board vehicle computer system comprises at least one processing unit a memory having therein computer-executable instructions configured to cause the on-board vehicle computer system to perform a computer-implemented method described herein. In at least one embodiment, the on-board vehicle computer system is configured to detect a condition of a vehicle; identify a de-rate cause for the vehicle in a hierarchical set of de-rate causes, wherein the de-rate cause is associated with the condition; select a de-rate type from a set of possible de-rate types based at least in part on the de-rate cause; select an initial de-rate level from a set of possible de-rate levels based at least in part on the de-rate cause; present an operator notification associated with the de-rate cause via an operator interface; activate a de-rate for the vehicle according to the de-rate type and the initial de-rate level; detect a change in the condition; and update the initial de-rate level based at least in part on the change in the condition.

DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
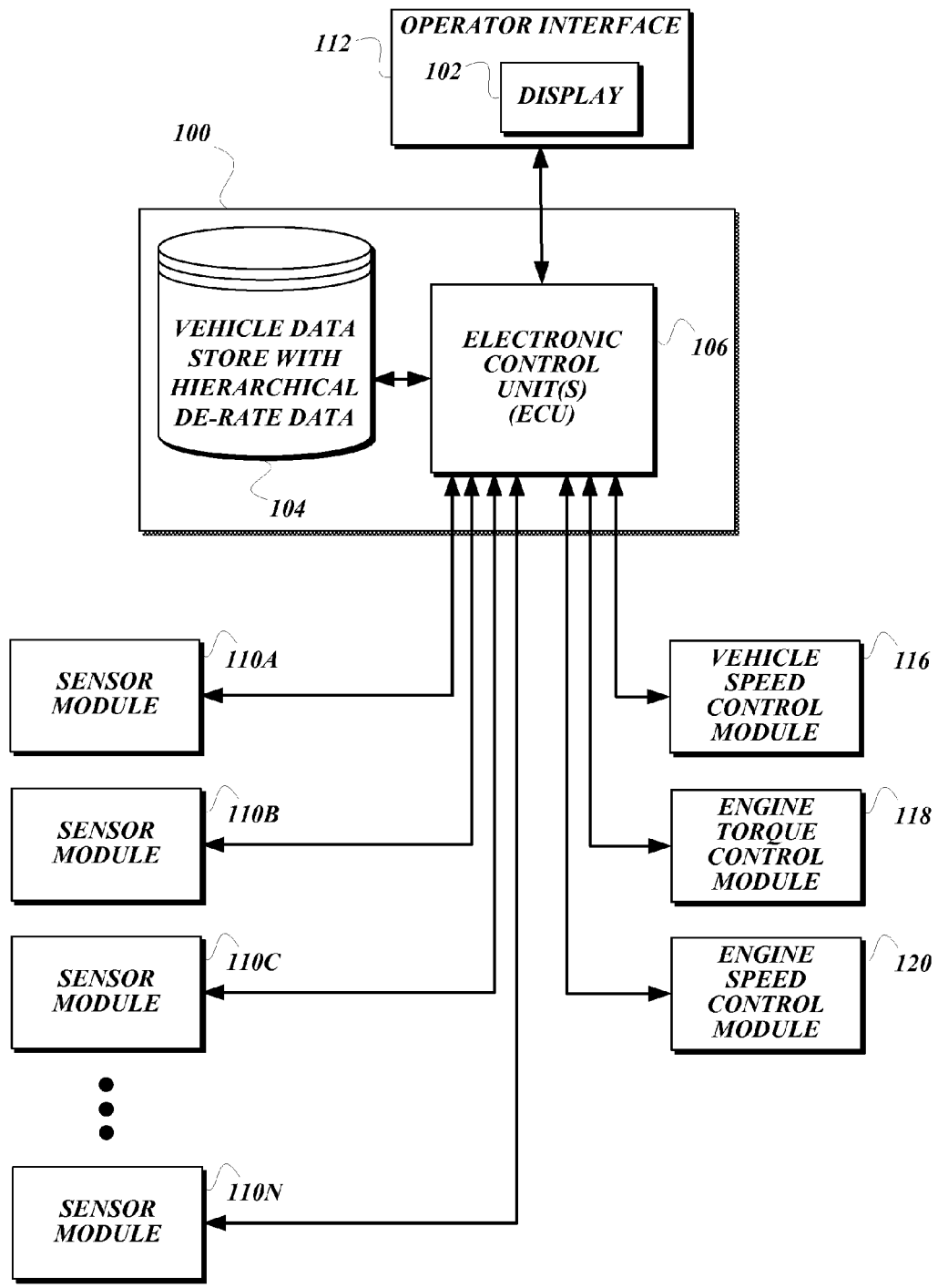
FIG. 1 is a schematic diagram of an illustrative on-board vehicle computing system comprising a hierarchical vehicle de-rate and notification system.

The detailed description set forth below in connection with the appended drawings is an illustrative and non-limiting description of various embodiments of the disclosed subject matter. The following description proceeds with reference to examples of computer systems and methods suitable for use in vehicles, such as Class 8 trucks. Although illustrative embodiments of the present disclosure will be described hereinafter with reference to trucks, it will be appreciated that aspects of the present disclosure have wide application, and therefore, may be suitable for use with many types of vehicles, such as passenger vehicles, buses, commercial vehicles, light and medium duty vehicles, etc.

In general, the examples of the computer systems and methods described herein provide a hierarchical structure for de-rates and related processes. As used herein, the term "de-rate" is used to describe a reduction of available vehicle function (e.g., engine torque, engine speed, or vehicle speed) that is not intended or requested by an operator.

The disclosed subject matter provides a comprehensive treatment of possible reasons for imposing a de-rate (e.g., durability, safety, regulatory), de-rate causes (e.g., oil temperature too high, coolant temperature too high, exceeding turbo speed limits related to altitude, exceeding exhaust system backpressure limits, selective catalytic reduction (SCR) system failure, and other possible causes), de-rate types (e.g., engine torque limit, engine speed limit, vehicle speed limit), and de-rate levels (e.g., no de-rate, moderate de-rate, severe de-rate, shutdown). Information relating to active de-rates, imminent de-rates, shutdown events, and the like can be communicated to drivers in real time.

Embodiments described herein provide advantages over prior systems. For example, a hierarchical structure for de-rate levels (e.g., escalating levels of de-rates via a prescribed schedule) is described. As another example, a mapping of de-rate causes to appropriate starting de-rate levels is described. As another example, a mapping of slew rates that correspond to particular de-rate types is described. In addition, appropriate notification can be provided to drivers that can alert drivers to problematic vehicle conditions and corresponding solutions. Prior systems have failed to provide a comprehensive treatment of possible de-rate causes, de-rate levels, de-rate types, and related notifications. For example, prior systems have failed to provide a hierarchical structure for de-rate causes and levels, a meaningful mapping of de-rate causes to starting de-rate levels, or a mapping of slew rates appropriate for specific de-rate types.

As described herein with reference to various embodiments, a consistent hierarchy is used to impose de-rates in response to various vehicle conditions and to provide related feedback to vehicle operators. De-rates are classified by cause (that is, an underlying vehicle condition), type, and level. De-rates are divided into categories based on the reasons or rationale for imposing the respective de-rates. An appropriate level of feedback can be provided to the vehicle operator so that the operator can adjust how the vehicle is being operated to respond to a de-rate and resolve the issue that is causing the de-rate. A framework is provided for increasing the de-rate level if the de-rate cause is not resolved.

Operating Environment

It should be understood that various embodiments of the present disclosure include logic and operations performed by electronic components. These electronic components, which may be grouped in a single location or distributed over a wide area, generally include processors, memory, storage devices, display devices, input devices, etc. It will be appreciated by one skilled in the art that the logic described herein may be implemented in a variety of hardware, software, and combination hardware/software configurations, including but not limited to, analog circuitry, digital circuitry, processing units, and the like. In circumstances where the components are distributed, the components are accessible to each other via communication links. A controller area network (CAN) bus can be used to communicate vehicle operating conditions as specified by the Society of Automotive Engineers (SAE) J1939 standard.

FIG. 1 illustrates one embodiment of a hierarchical de-rate and notification system 100 of a vehicle according to various aspects of the present disclosure. The system 100 includes at least one electronic control unit (ECU) 106 that monitors vehicle status and causes operator notifications to be generated when appropriate. The system communicates with an operator interface 112 comprising an operator display 102. The operator display 102 may be any type of display used in a vehicle to convey information (e.g., de-rate notifications) to the operator. For example, the operator display 102 may include an LCD display configured to display information to the operator much like any other computing display. As another example, the operator display 102 may include special purpose lighted displays, needle gauges, and/or the like. The operator interface 112 also may include other output devices such as speakers or haptic feedback devices to provide information to the operator. In a touchscreen configuration, the operator display 102 may have input capabilities. The operator interface 112 also may include other input devices including buttons, toggles, keyboards, mechanical levers, and any other devices that allow an operator to provide input to the ECU 106.

It will be appreciated that the ECU 106 can be implemented in a variety of hardware, software, and combination hardware/software configurations, for carrying out aspects of the present disclosure. For example, the ECU 106 may include memory and a processor. In one embodiment, the memory comprises a random access memory ("RAM") and an electronically erasable, programmable, read-only memory ("EEPROM") or other non-volatile memory (e.g., flash memory) or persistent storage. The RAM may be a volatile form of memory for storing program instructions that are accessible by the processor. The processor is configured to operate in accordance with program instructions. The memory may include program modules, applications, instructions, and/or the like that are executable by the processor. In particular, the memory may include program instructions that implement functionality of the hierarchical de-rate and notification system 100.

The ECU 106 is communicatively coupled to a plurality of sensors 110A-110N that provide information concerning the status of the vehicle. For example, in a disclosed embodiment, the ECU 106 is communicatively coupled to a diesel exhaust fluid (DEF) sensor module, an SCR system sensor module, an exhaust temperature sensor module, an oil temperature sensor module, an oil pressure sensor module, a fuel temperature sensor module, a coolant temperature sensor module, a turbo speed sensor module, an exhaust pressure sensor module, an inlet air pressure sensor module, and an inlet air temperature sensor module configured to provide real-time data about corresponding subsystems of the vehicle.

The ECU 106 is communicatively coupled to a vehicle speed control module 116, an engine torque control module 118, and an engine speed control module 120. In one embodiment, the modules 116, 118, and 120 (which can be collectively referred to as vehicle performance control modules) electronically control maximum vehicle speed, engine torque, and engine speed, respectively, according to input received from the ECU 106. Electronic control modules for controlling vehicle speed, engine torque, and engine speed are known in the art, and the present disclosure is not limited to any particular control module. The vehicle performance control modules can be used to control vehicle performance in accordance with the described hierarchical de-rate and notification system 100.

The illustrated ECU 106 is also communicatively coupled to a vehicle data store 104 with hierarchical vehicle de-rate data. The vehicle data store 104 includes a computer-readable storage medium. Any suitable nonvolatile computer-readable storage medium, such as an EEPROM, flash memory, hard disk, or the like may be used. In one embodiment, the hierarchical vehicle de-rate data is used by the hierarchical de-rate and notification system 100, as described herein, to perform one or more of the functions described herein. For example, the description makes reference to vehicle data that can be sensed and stored during vehicle operation, as well as programmable settings that can be programmed by the vehicle manufacturer, the owner, the operator, or any other suitable entity.

Components described herein may be communicatively coupled by any suitable means. In one embodiment, components may be connected by an internal communications network such as a vehicle bus that uses a controller area network (CAN) protocol, a local interconnect network (LIN) protocol, and/or the like. Those of ordinary skill in the art will recognize that the vehicle bus may be implemented using any number of different communication protocols such as, but not limited to, Society of Automotive Engineers ("SAE") J1587, SAE J1922, SAE J1939, SAE J1708, and combinations thereof. In other embodiments, components may be connected by other networking protocols, such as Ethernet, Bluetooth, TCP/IP, and/or the like. In still other embodiments, components may be directly connected to each other without the use of a vehicle bus, such as by direct wired connections between the components. Embodiments of the present disclosure may be implemented using other types of currently existing or yet-to-be-developed in-vehicle communication systems without departing from the scope of the claimed subject matter.

Illustrative Hierarchical Vehicle De-Rate and Notification System

This section describes an illustrative hierarchical vehicle de-rate and notification system. Although illustrative details are provided in this section, it should be understood that alternative systems and methods can be implemented and used in accordance with the present disclosure.

De-Rate Causes

Vehicle conditions that cause de-rate levels to be triggered can be referred to as de-rate causes. The particular conditions to be addressed can depend on vehicle safety and maintenance guidelines, legal guidelines (e.g., EPA guidelines), or other factors. Although a de-rate cause may lead to a de-rate, the identification of a particular vehicle condition as a de-rate cause does not necessarily imply that a de-rate is active. For example, a de-rate cause may trigger a warning to a vehicle operator prior to activation of a de-rate in order to give the operator time to resolve a problematic vehicle condition and avoid activation of the de-rate.

In this example, de-rate causes exist when any of the following parameters are found to be outside expected operating ranges: oil pressure, oil temperature, fuel temperature, coolant temperature, turbo speed, exhaust temperature, exhaust pressure, inlet air pressure, inlet air temperature, diesel exhaust fluid (DEF) level, DEF quality. A de-rate cause also exists when an SCR system fault (e.g., due to tampering) is detected. Alternatively, other de-rate causes may be defined.

Categories of De-Rate Causes

In this example, de-rates are imposed for at least one of three main reasons: durability (vehicle and/or powertrain protection), safety issues, and regulatory compliance. De-rates that relate to durability can be further divided into de-rates that are aimed to prevent subsystem failures prevention and de-rates that aim to prevent further damage after a failure has been detected. De-rate causes can be divided into categories based on these reasons, as shown in Table 1, below:

TABLE 1

Categories of de-rate causes

| Category (Reason for De-rate) | Description |
| --- | --- |
| Durability: Prevent Failure | Prevent engine or after-treatment system damage |
| Durability: Post-Failure/ Prevent Further Damage | After failure, prevent further damage to engine or after-treatment system |
| Regulatory | Comply with regulation(s) (e.g., pollution regulation) |
| Safety | Address dangerous condition, promote safe operation |

Some de-rate causes may have more than one underlying reason. For example, if an elevated exhaust temperature is prone to cause a dangerous condition in a vehicle, safety may be designated as the primary reason for a de-rate, while durability of the exhaust system may be a secondary reason for the de-rate. In this illustrative example, de-rate causes are divided into categories based on the primary reason for the de-rate.

De-Rate Types

In this example, three de-rate types are described: engine torque, vehicle speed, and engine speed. In general, engine torque de-rates are desirable for their ability to encourage operators to resolve de-rate causes while still allowing safe operation of the vehicle. However, as explained in further detail below, vehicle speed and engine speed de-rates are appropriate for some de-rate causes.

In at least one embodiment, engine torque de-rates do not provide less than the claimed torque-at-engagement of the engine or 660 ft-lbs, whichever is greater, to ensure that shift events can be executed and that the vehicle can be driven to a safe location. However, engine torque de-rates may vary in their application from the examples described herein, e.g., for safety or regulatory reasons.

In at least one embodiment, vehicle speed de-rates enable operation at 40 kph (25 mph) or greater. However, vehicle speed de-rates may vary from the examples described herein, e.g., for safety or regulatory reasons.

De-Rate Levels

Activation of de-rates and related feedback are performed in stages referred to herein as "de-rate levels." Conceptually, many de-rate levels can be thought of as inducement stages in view of the idea that vehicle operators can be induced to address problematic vehicle conditions by warnings or reduced vehicle performance. In practice, the triggering of a particular de-rate level can depend on many factors including vehicle sensor readings, other vehicle status information (e.g., whether the vehicle is running or moving), and vehicle type (e.g., whether the vehicle is classified as an emergency vehicle).

Some de-rate levels may involve only operator notifications. Other de-rate levels may involve both notifications and active de-rates. De-rates that involve notifications can be referred to as operator-notified de-rates. Many of the de-rates described herein are operator-notified de-rates, and are implemented with feedback to be presented to a user, such as a dash light, an audible noise, a message and/or graphics on a display, or some combination of feedback. The feedback may imply or explicitly identify the presence of a de-rate, the cause of a de-rate, etc. Alternatively, silent de-rates also can be used. A silent de-rate is implemented without any notification to the operator of the presence of the de-rate or the cause of the de-rate.

In at least one embodiment, de-rate levels shown in Table 2, below, are used for one or more de-rate causes. The identification of a particular stage or level as a "de-rate level" does not necessarily imply that a de-rate is active at that level. For example, Level 0 is a normal operating condition in which no de-rate is active. Other de-rate levels may involve warnings or other feedback without an active de-rate.

TABLE 2

| De-rate levels | |
| --- | --- |
| Level Classification | Name |
| 0 | Normal Operating Conditions |
| S | Silent De-Rate |
| 1 | Request Level |
| 2 | Warn Level |
| 3 | Service Level |

TABLE 2-continued

De-rate levels

| Level Classification | Name |
|---|---|
| 4 | Stop Level |
| 5 | Impending Shutdown |
| Shutdown | Shutdown |

As shown in Table 2, Level 0 ("Normal Operating Condition") refers to a normal engine operating state where no de-rate causes exist. At Level S ("Silent De-rate"), a de-rate cause exists but communication to the operator regarding the de-rate is suppressed or non-existent by default, unless a programmable parameter is enabled. Level S can be skipped or not implemented in many situations, such as when a particular de-rate type (e.g., vehicle speed limit) or category of de-rate causes (e.g., safety) is not appropriate for a silent de-rate, or when a vehicle owner wants all de-rates to be communicated to operators. In view of the general lack of communication to the operator, silent de-rates are restricted in at least one embodiment to torque-based de-rates that do not exceed 5% of maximum specified torque at the given engine speed, and de-rates greater than 5% utilize a Level 1 or greater (non-silent) classification.

Level 1 ("Request Level") can include notifying the operator that a de-rate cause is present and/or providing information on how to resolve the problematic condition. Level 2 ("Warn Level") can include a greater de-rate percentage (if a de-rate is active) as well as additional or different notifications. Level 3 ("Service Level") can include notifying the operator that a de-rate is active and that the vehicle should be serviced soon. Level 4 ("Stop Level") can include notifying the operator that they have an active de-rate and that they need to stop the engine as soon as possible to prevent further system damage or to address safety and/or regulatory concerns.

Level 5 ("Impending Shutdown") can include a brief sequence with a shutdown timer that leads to forced shutdown of the engine (or after-treatment system, as appropriate) at the Shutdown Level. Level 5 and Shutdown Level are typically preceded by less severe de-rates to allow the operator a chance to prevent the shutdown event from occurring. In at least one embodiment, vehicles have at least 3 shutdown times available for shutdown timers, and de-rate causes can be mapped to one of the available shutdown times. The particular time used for a shutdown timer can depend, for example, on the reason for the de-rate or on other factors. It is possible for more than one shutdown timer to be active, such as where multiple de-rate causes are currently at Level 5. If multiple timers are active, the timer with the least time remaining prior to shutdown can be displayed.

Once a shutdown event has been successfully achieved, the operator can restart the vehicle and have minimal function to ensure safe operation. Accommodations can be made in the restart strategy to delay restart or provide limited function after a shutdown until the cause of the shutdown has been sufficiently mitigated.

The operator may have the ability to override the shutdown (e.g., via an optional switch in the dash). In at least one embodiment, basic override functionality provides an "indefinite override" command (except in the case of safety-related shutdowns) until a "key off" event, and the override command is logged in the appropriate controller(s).

The number of de-rate levels used and the characteristics of de-rate levels may differ from the levels described above. For example, Level 3 can be divided into "Service Level A" (Level 3A) and "Service Level B" (Level 3B), with Level 3A being used for vehicle conditions that do not require immediate service and Level 3B being used for vehicle conditions that require immediate service.

Setting Initial De-Rate Levels Based on Reasons for De-Rates

In this example, the hierarchical de-rate system includes a mapping of different de-rate causes to different initial de-rate levels based on a category of the de-rate cause. In particular, initial de-rate levels are set depending on the primary reason for the de-rate, in order to provide a consistent operating experience and to emphasize the importance of some de-rate causes over others. For example, de-rates that are imposed in order to prevent failure of a vehicle subsystem can be assigned lower initial de-rate levels than de-rate that are imposed for safety reasons. General guidelines for initial de-rate are shown in Table 3, below:

TABLE 3

Initial de-rate levels by category

| Category (Reason for De-rate) | Initial De-rate Level |
|---|---|
| Durability: Prevent failure | Level S or Level 1 |
| Durability: Post-failure - prevent further damage | Level 3 |
| Regulatory | Level 2 or higher (e.g., based on regulation mandate and/or manufacturer discretion) |
| Safety | Level 4 |

Progression to higher levels of de-rates may take place once the initial de-rate level has been applied, as described in further detail below.

Illustrative De-Rate Hierarchy

In this example, a hierarchical de-rate system implements the hierarchy of de-rate causes shown in Table 4, below, with corresponding categories, de-rate levels, and de-rate types. As shown in Table 4, the categories of the de-rate causes are based on the primary underlying reasons for imposing the respective de-rates. The categories include "Durability—Prevent Failure," "Durability—Post-Failure/Prevent Further Damage," "Safety," and "Regulatory."

TABLE 4

De-rate causes with corresponding categories, levels, and types

| De-rate Cause | Category (Reason for De-rate) | Initial Level | Further Levels | De-rate Type |
|---|---|---|---|---|
| Oil temperature too high | Durability - Prevent Failure | 1 | 2, 3 | engine torque |
| Fuel temperature too high | Durability - Prevent Failure | 1 | 2, 3 | engine torque; engine speed |
| Coolant temperature too high | Durability - Prevent Failure | 1 | 2, 3 | engine torque |
| Turbo speed too high/fast | Durability - Prevent Failure | 1 | 2, 3 | engine torque |
| Exhaust temperature too high | Safety | 4 | 5, Shutdown | engine torque; engine speed |
| Exhaust pressure too high | Durability - Prevent Failure | 1 | 2, 3, 4, 5, Shutdown | engine torque |
| Inlet air pressure too high | Durability - Prevent Failure | 1 | 2, 3 | engine torque |
| Inlet air temperature too high | Regulatory | 2 | 3 | engine torque |
| Inlet air pressure too low | Durability - Prevent Failure | 1 | 2, 3 | engine torque |

TABLE 4-continued

De-rate causes with corresponding categories, levels, and types

| De-rate Cause | Category (Reason for De-rate) | Initial Level | Further Levels | De-rate Type |
|---|---|---|---|---|
| DEF level too low | Regulatory | 2 | 4 | engine torque; vehicle speed |
| DEF quality/ SCR system fault | Regulatory | 2 | 4 | engine torque; vehicle speed |
| Oil pressure too low | Durability - Post-Failure/ Prevent Further Damage | 3 | 4, 5, Shutdown (optional) | engine torque; engine speed |

The initial de-rate level that is set for the de-rate cause depends on the category. For example, de-rates that are imposed to prevent subsystem failures have an initial de-rate level of 1, de-rates imposed for a regulatory reason have an initial de-rate level of 2, de-rates imposed to prevent further damage have an initial de-rate level of 3, and de-rate imposed for a safety reason have an initial de-rate level of 4. Further de-rate levels in the progression may not be the same for de-rate causes that have the same initial de-rate level. For example, as shown in Table 4, if the inlet air temperature is too high, the initial de-rate level is set at 2 and the next de-rate level is set at 3. However, if the diesel exhaust fluid (DEF) level is too low, the initial de-rate level is set at 2, but the next de-rate level is set at 4. These differences may be due to regulatory requirements, system design issues, or other factors.

Different de-rate causes may have different corresponding de-rate types. In this example, as illustrated in Table 4, although all the de-rate causes listed in Table 4 have engine torque as a corresponding de-rate type, some de-rate causes (e.g., fuel temperature too high, exhaust temperature too high) also have engine speed as a possible de-rate type, while other de-rate causes (e.g., de-rate causes relating to DEF) also have vehicle speed as a possible de-rate type.

In at least one embodiment, the de-rate causes shown in Table 4 are treated according to the following rationale.

Regarding oil, fuel, and coolant temperature, power is controlled by Level 3 to ensure that the respective temperatures stay within acceptable limits. Regarding the de-rate types available for de-rates relating to fuel temperature, an engine speed de-rate is allowed because the physics of the fuel injection system are such that more heat is produced at higher engine speeds regardless of engine torque output. Therefore, a de-rate that affects only engine torque may not be sufficient in some situations to prevent damage.

Regarding turbo speed, a maximum turbo speed limit can help to prevent damage due to centrifugal forces on turbo blades. As altitude increases the turbocharger increases speed to try to compensate for a decrease in air density.

Regarding exhaust temperature, the limit is designed to prevent dangerous diesel particulate filter (DPF) events. Because safety is the reason for this de-rate, the key concern is shutting down the vehicle safely, and an engine speed de-rate is allowed.

Regarding inlet air temperature and pressure, higher intake pressures and temperatures lead to higher combustion pressures and temperatures, respectively, which lead to more pollutants. Higher inlet temperatures also lead to less dense air, which can be a precursor to overspeeding the turbocharger. The engine de-rate helps to avoid these consequences. On the other hand, low inlet pressure can lead to higher turbocharger speeds, which can be a precursor to a turbo over-speed condition.

Regarding oil pressure, a low oil pressure condition is typically associated with a failed seal in the lubrication loop of the engine. In at least one embodiment, an accelerated progression (e.g., to Level 5 and Shutdown) is provided as an option to protect against engine failure due to loss of lubricant.

Slew Rates

Figure 2:
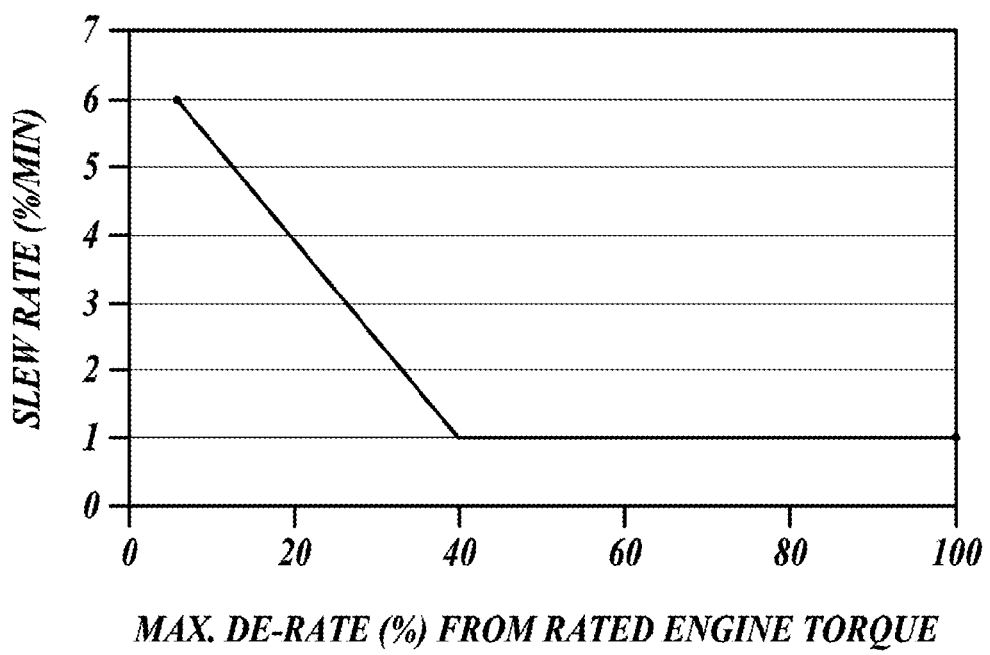
FIG. 2 is a graph of slew rates that can be used by a computing system such as the on-board vehicle computing system of FIG. 1 when imposing engine torque de-rates on a vehicle.

Table 5, below, shows example slew rates for different de-rate types, with reference to FIG. 2. In this example, the slew rate for torque-based de-rates is based on the maximum de-rate implemented at the current de-rate level. As shown in FIG. 2, the percentage reduction per minute declines (e.g., from 6% per minute to 1% per minute) as the maximum de-rate increases (e.g., up to 40%). Above 40%, the percentage reduction per minute remains at 1%. In at least one embodiment, de-rates of less than a 5% reduction in engine torque may be implemented immediately without regard to slew rate requirements.

In the example shown in Table 5, if engine speed de-rates are used, engine speed is reduced no faster than 10 rpm/s. If vehicle speed de-rates are used, vehicle speed is reduced no faster than 0.15 m/s$^2$ (or 0.50 ft/s$^2$). For many de-rates (e.g., durability de-rates), the slew rate is designed such that the de-rate is implemented gradually to provide a feeling of lost functionality, but not of lost operating capability.

TABLE 5

Slew rates by de-rate type

| De-rate Type | Slew Rate |
|---|---|
| Engine torque | See FIG. 2 |
| Engine speed | 10 rpm/s (if authorized) |
| Vehicle speed | .15 m/s$^2$ |
| Shutdown | Notification minimum of 60 seconds prior to shutdown. |

Slew rates can differ from the rates described above. For example, the slew rate for regulatory de-rates can be implemented to comply with the applicable regulation(s). As another example, slew rates for safety de-rates can be implemented in a fashion that resolves the safety-related issue as quickly as possible, thereby prioritizing safe de-rating and shutdown of the vehicle over concerns for performance and feel.

In the case of shutdown de-rates, a minimum time setting is used to allow the operator time to safely stop the vehicle. In this example, the shutdown occurs no more than 60 seconds from the first customer notification of a pending shutdown. The minimum time that is used can vary depending on implementation, owner preferences, de-rate cause, or other factors.

Operator Notifications

A variety of lamps, graphics, messages, and other output can be used to provide de-rate-related feedback to operators. Such feedback can be referred to as operator notifications. In addition to basic indicators such as a check engine lamp, a stop engine lamp, and a function-specific telltale (e.g., a hard-wired or network-based telltale that is specific to a function in the vehicle), display messages can be used to provide detailed information to operators that describe, for example, the nature of the de-rate and steps to be taken to resolve the de-rate cause. Example display messages are described in detail below.

In the example shown in Table 6, at Level 0 and Level S no feedback related to a de-rate is given, and at Shutdown Level, the check engine lamp, the stop engine lamp, a display message, and a function-specific telltale (if available) are all used to provide feedback to the operator. Intermediate levels involve different degrees and combinations of feedback. A malfunction indicator lamp (MIL) also can be illuminated independent of the other feedback that is used.

TABLE 6

Example operator notifications by de-rate level

| Level | Check Engine Lamp | Stop Engine Lamp | Display Message | Function-specific Telltale (if available) |
|---|---|---|---|---|
| Level 0 | off | off | none | off |
| Level S | off | off | none | off |
| Level 1 | off | off | optional | on |
| Level 2 | off | off | optional | on |
| Level 3A | on | off | optional | on |
| Level 3B | on | off | optional | on |
| Level 4 | off or on | on | on | on |
| Level 5 | off or on | on | on | on |
| Shutdown | on | on | on | on |

Example Operator Notifications

In the following examples, sequences of screenshots are described for notifications at corresponding de-rate levels for an engine de-rate from Level 1 through Shutdown. A progression from a lower de-rate level to a higher de-rate level allows vehicle and fleet operators to receive information about a range of de-rate levels, and also allows operators to be warned of impending shutdowns or severe de-rates by first being presented with less severe de-rates. It is also useful (and may be mandated by safety regulations) for a shutdown event to be preceded by a countdown warning to give an operator sufficient time to safely park the vehicle.

In these examples, operator notifications (e.g., display messages) comprising visual elements are described. Depending on implementation, the visual elements can include graphics, text, icons, and the like. In some embodiments, notifications are non-suppressible (that is, they cannot be dismissed by an operator until the underlying cause is resolved). Alternatively, some notifications may be suppressible, while others (e.g., notifications associated with Level 5 and Shutdown Level, or notifications mandated by safety regulations) may not be suppressible.

The elements described in the following examples can be replaced with any other elements that are suitable for communicating the information described in these examples. Further, the elements described in the following examples can be presented in different ways (e.g., in different colors, sizes, or display locations; animated or static; flashing or not flashing; flashing at different rates; with or without sound; movable (e.g., by an operator interacting with a touchscreen) or in a fixed location; etc.) to communicate the information described in these examples.

Figure 3A:
FIGS. 3A-17 are examples of operator notifications that may be generated by a computing system such as the on-board vehicle computing system of FIG. 1.
Figure 3B:
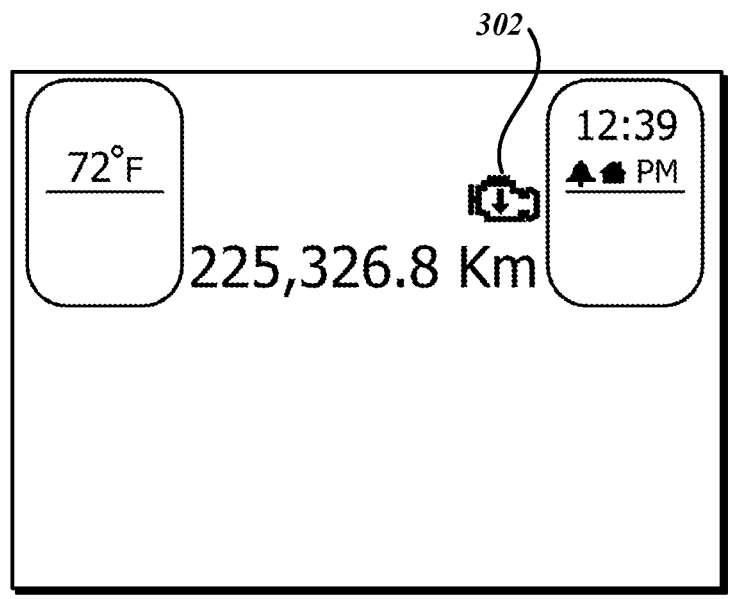

Examples of Level 1 display messages are shown in FIGS. 3A and 3B. In the examples shown in FIGS. 3A and 3B, the engine de-rate icon 302 indicates that a de-rate is active. The visual elements shown in FIGS. 3A and 3B can be replaced or supplemented with additional elements, such as descriptive text (e.g., "Engine De-rate").

Figure 4A:
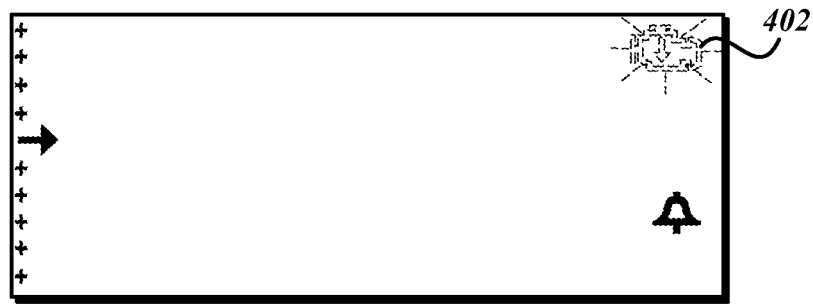
Figure 4B:
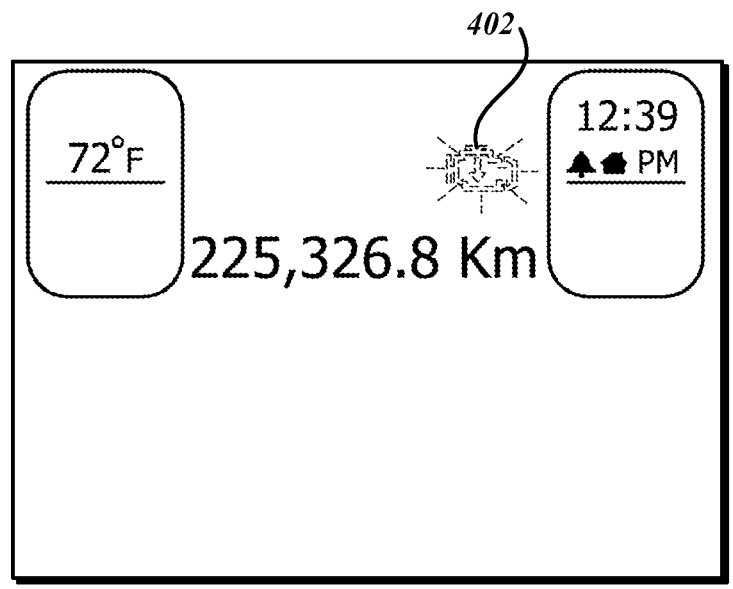

Examples of Level 2 display messages are shown in FIGS. 4A and 4B. In the examples shown in FIGS. 4A and 4B, a flashing engine de-rate icon 402 is flashing at a rate of 1 Hz. The visual elements shown in FIGS. 4A and 4B can be replaced or supplemented with additional elements, such as descriptive text (e.g., "Engine De-rate").

Figure 5A:
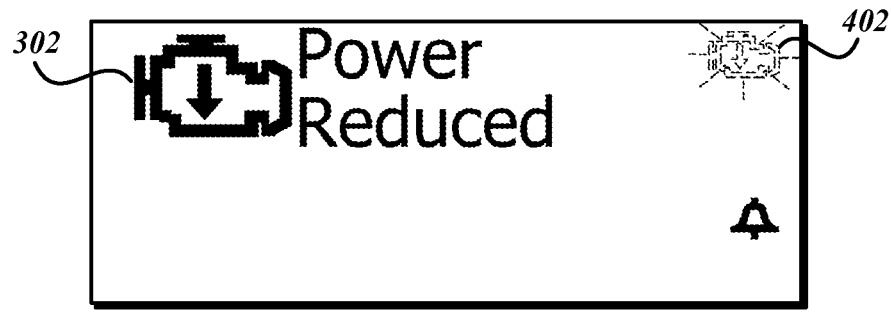
Figure 5B:
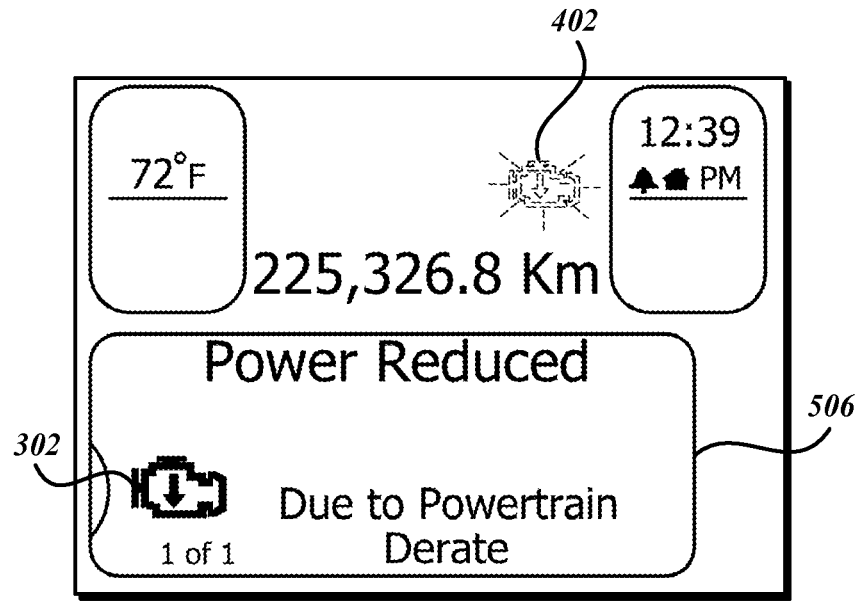

Examples of Level 3A and 3B display messages are shown in FIGS. 5A and 5B. In the examples shown in FIGS. 5A and 5B, flashing engine de-rate icons 402 are flashing at a rate of 1 Hz. FIGS. 5A and 5B also include additional elements to increase the urgency of the communication with the driver. For example, FIGS. 5A and 5B include the text "Power Reduced." In FIG. 5B, the cause of the de-rate is indicated within a pop-up window element 506, which includes the text "Power Reduced Due to Powertrain De-rate." The visual elements shown in FIGS. 5A and 5B can be replaced or supplemented with additional elements, such as such as a "service engine" icon.

As used in these examples, "Powertrain De-rate" can indicate any of several different de-rate causes (e.g., high oil temperature, high fuel temperature, etc.) that relate to the vehicle powertrain. Alternatively, display messages can include a more specific indicator of the de-rate cause. As another alternative, display messages can include an indicator of a de-rate cause that may not be considered a powertrain de-rate (e.g., a regulatory de-rate, such as a de-rate caused by low DEF).

Figure 6A:
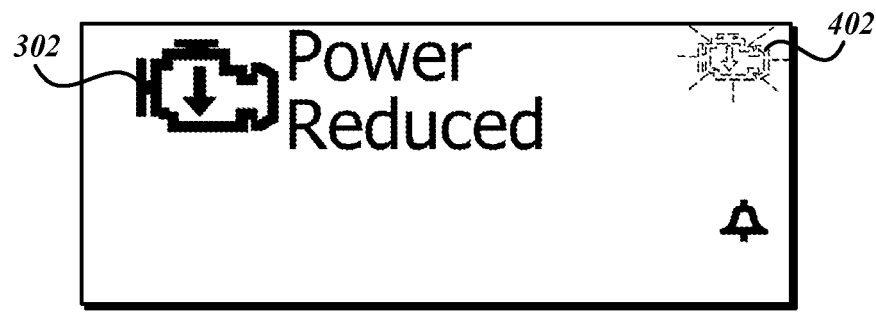
Figure 6B:
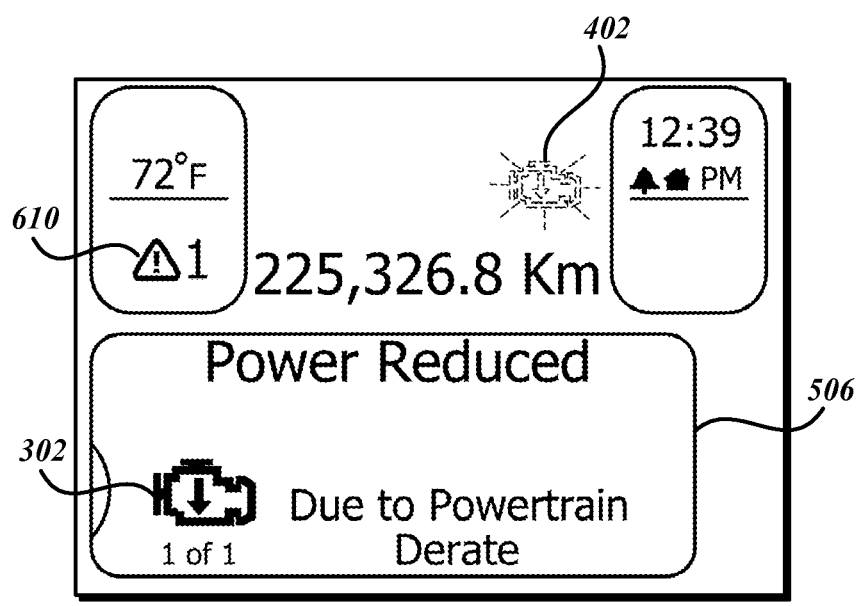

Examples of Level 4 display messages are shown in FIGS. 6A and 6B. In the examples shown in FIGS. 6A and 6B, flashing engine de-rate icons 402 are flashing at a rate of 1 Hz. FIGS. 6A and 6B also include additional elements to increase the urgency of the communication with the driver. For example, FIGS. 6A and 6B include the text "Power Reduced." In FIG. 6B, the cause of the de-rate is indicated within a pop-up window element 506, which includes the text "Power Reduced Due to Powertrain De-rate." FIG. 6B also includes a triangle icon 610 that further indicates the presence of high priority messages. The visual elements shown in FIGS. 6A and 6B can be replaced or supplemented with additional elements, such as a "service engine" icon or a "stop engine" icon.

Figure 7A:
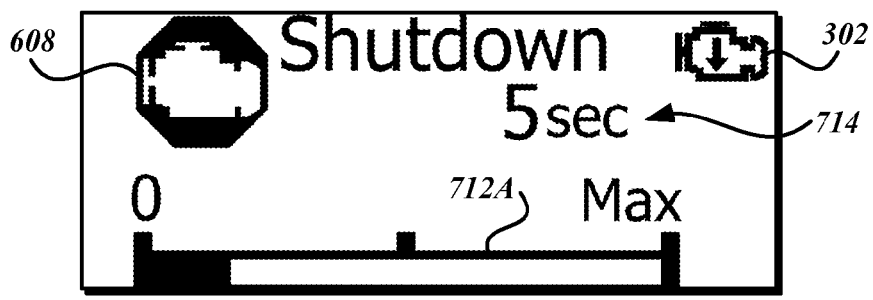
Figure 7B:
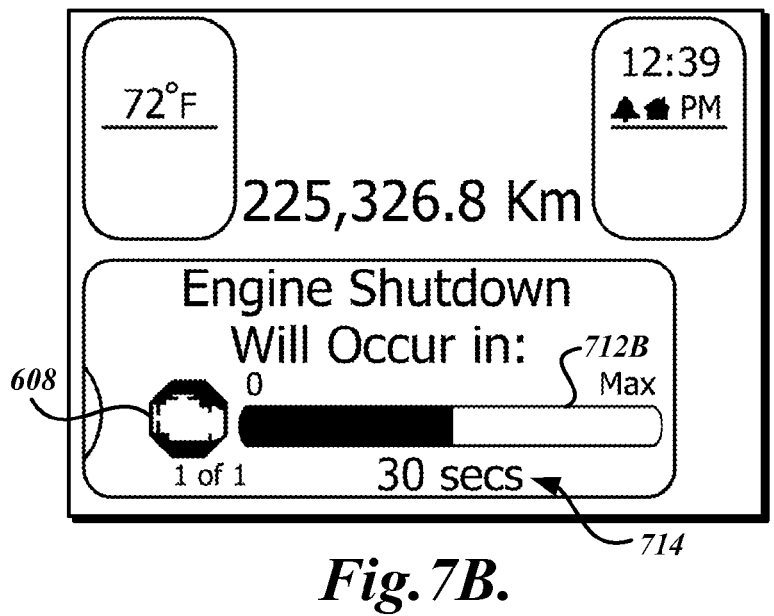

Examples of Level 5 ("Impending Shutdown") display messages are shown in FIGS. 7A and 7B. In the examples shown in FIGS. 7A and 7B, graphic timers 712A, 712B and numeric timers 714 indicate the time remaining before engine shutdown to allow the operator to find a safe place to park the vehicle prior to engine shutdown. The timers are presented along with stop engine icon 608. In the examples shown in FIGS. 7A and 7B, the countdown timers are displayed with corresponding text (e.g., "Shutdown" or "Engine Shutdown Will Occur") that indicates the purpose of the timer. The examples shown in FIGS. 7A and 7B omit some information shown in previous examples (e.g., icons and text that indicate the cause of the de-rate), which can help to remove visual noise and clarify the communication of the shutdown warning to the operator.

Figure 8A:
Figure 8B:
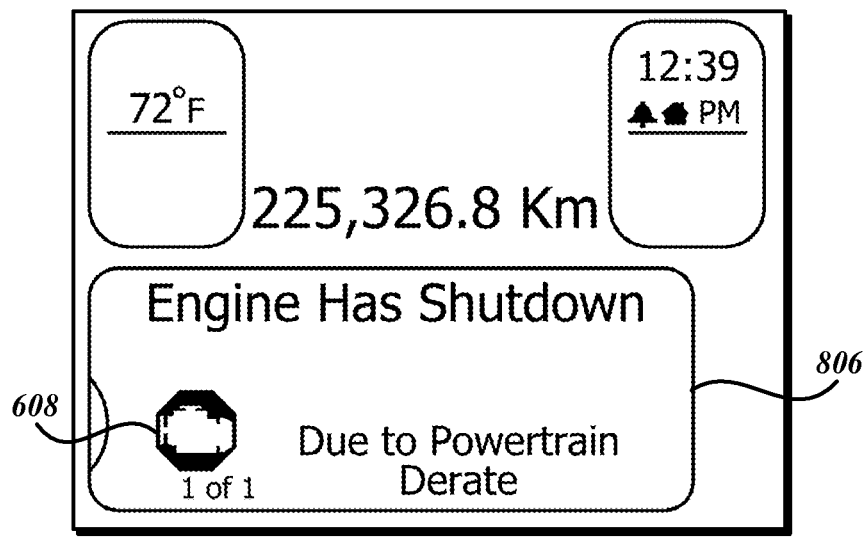

Examples of Shutdown Level display messages are shown in FIGS. 8A and 8B. The examples in FIGS. 8A and 8B all include a stop-engine icon 608 with corresponding text (e.g., "Engine Shutdown" or "Engine has Shut Down") to indicate that the engine has shut down. In FIG. 8B, the cause of the de-rate is indicated within a pop-up window element 806, which includes the text "Due to Powertrain De-rate."

As shown in these examples, de-rate information can be provided in combination with other information. For example, in FIGS. 3B, 4B, 5B, 6B, 7B, and 8B, de-rate information is provided below a home screen that includes an exterior temperature, time of day, and an odometer reading.

Exterior Notifications

In some scenarios, truck operators may be required to spend significant amounts of time outside the truck cab. For these situations, operators can be notified of de-rates or potential de-rates via external warnings (e.g., flashing lights, horn, etc.). External warnings can be enabled (e.g., by a vehicle owner) via a programmable parameter. If enabled by the programmable parameter, activation of external warnings still may depend on additional factors. For example, external warnings may not be activated unless the truck is not moving (speed=0) and the parking brake is set. External notifications can be useful, for example, where a particular de-rate cause may result in a dangerous condition outside the truck (e.g., exhaust temperature too high). If activated, external warnings may be overridden by the operator (e.g., via a switch in the dash).

Integration with Engine Protection Strategy Module

The characteristics of de-rate levels described herein can be modified. The ability to modify characteristics of de-rate levels described herein can be implemented as part of an engine protection strategy (EPS) module. For example, in addition to maintaining default settings with a default option, an EPS module can include multiple options for adjusting characteristics of de-rate levels for specific de-rate causes or categories of de-rate causes. The options can include a warning option and a shutdown option. The warning option can be used to specify that operator notifications are provided without the associated de-rate being activated. The warning option can be useful for de-rate causes associated with durability and regulatory issues. The shutdown option can be used to specify that, for identified de-rates, engine and/or after-treatment de-rates will proceed to Shutdown Level to protect the respective system from further damage.

Storage of De-Rate Information

Electronic records of de-rates can be stored for future reference and/or processing. For example, a code related to each declared de-rate can be made accessible via a service tool or an in-cab display. Codes can remain resident in the ECU memory until a service tool can retrieve them, even if the de-rate condition is resolved and a de-rate is no longer active. Stored information can include the de-rate, the timestamp of the cause, the de-rate levels used to address the cause of the de-rate, the timestamp of when each de-rate level was initiated, and/or other information relating to de-rates.

Detailed Example: Diesel Exhaust Fluid System

This detailed, illustrative example describes de-rates and notifications that relate to selective catalytic reduction (SCR) systems. In this example, an SCR system uses diesel exhaust fluid (DEF) comprising an aqueous urea solution to lower mono-nitrogen oxides ($NO_X$) in exhaust emissions from diesel engines. DEF is stored in one or more tanks on board the vehicle, and each tank may have its own DEF sensors. The SCR system converts $NO_X$ with the aid of a catalyst into diatomic nitrogen, $N_2$, and water.

DEF level is measured in terms of a percentage of DEF capacity in the DEF tank(s). If the DEF level is low or of poor quality, or if the SCR system is malfunctioning or has been tampered with, display messages or other output can be provided to notify the operator of the problematic condition, and a de-rate can be imposed. Notifications can include lighting of a DEF lamp, a display message comprising a DEF symbol, text, etc., audio, and/or other output that can be presented to an operator. Text provided in a display message may include a description of the condition (e.g., "Low DEF") and/or instructions as to how to resolve the condition (e.g., "Fill with DEF to prevent de-rate").

DEF Level Notifications and De-Rates

In this detailed example, threshold DEF levels are associated with corresponding de-rate levels. In general, the urgency of operator notifications and the severity of de-rates tend to increase as the level of DEF decreases. However, many exceptions and alternatives are possible. For example, emergency vehicles (e.g., fire trucks, ambulances, and the like) may be exempt from de-rates associated with some de-rate levels (e.g., Level 4, described below).

Figure 9:
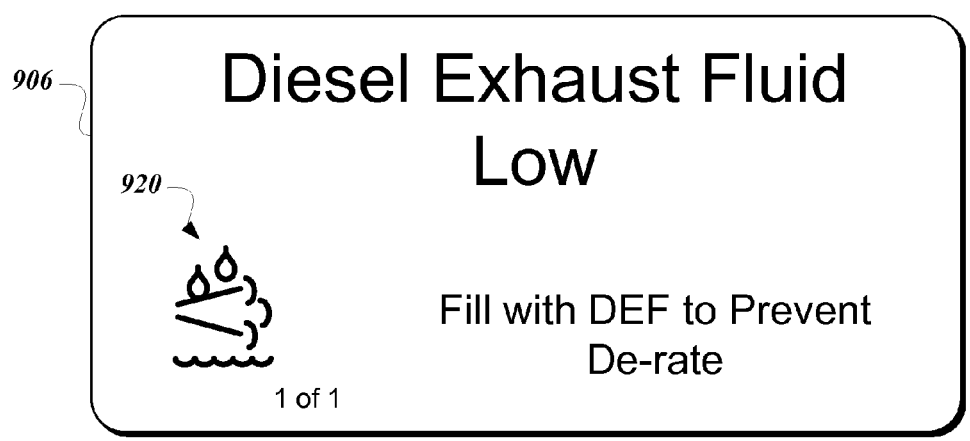

At Level 0 the DEF level is within normal limits and no notification is given. In Level 1 or 2, notifications are given but no de-rate is active. The notifications may include, for example, a DEF symbol at Level 1 and a flashing DEF symbol at Level 2. FIG. 9 shows an example Level 1 or Level 2 notification presented as a pop-up display message 906 on a graphical display. The DEF symbol 920 (which may be flashing) is displayed along with text (e.g., "Diesel Exhaust Fluid Low," "Fill with DEF to Prevent De-rate") that provides information on the reason for the notification and information relating to how a de-rate can be prevented from taking effect.

Figure 10:
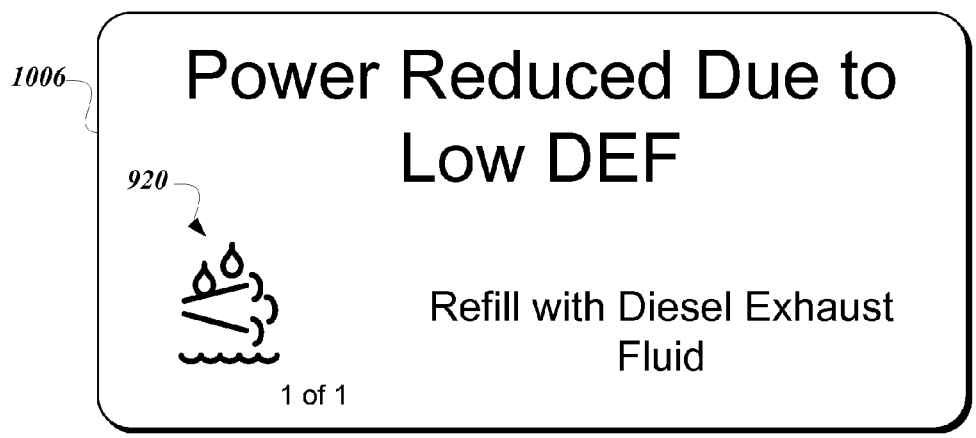

At Levels 3 and 4, notifications are provided and a de-rate is active. Level 4 can be associated with a DEF level sensor reading of "empty" or 0%. (Note that, per EPA guidelines, a DEF level sensor may communicate an "empty" reading while a usable reserve volume (e.g., 10% of capacity) is still in the tank.) Level 3 and Level 4 notifications may include, for example, a flashing DEF symbol, a check-engine lamp or symbol, and/or a display message. FIG. 10 shows an example Level 3/4 notification presented as a pop-up display message 1006 on a graphical display. The DEF symbol 920 (which may be flashing) is displayed along with text that informs the operator of the active de-rate (e.g., "Power Reduced Due to Low DEF") and instructions as to how to resolve the de-rate cause (e.g., "Refill with Diesel Exhaust Fluid").

At a Final Inducement Level, a notification is provided, a de-rate is active, and vehicle speed is limited. (A de-rate in which vehicle speed is limited can be referred to as a "limp home" mode.) In at least one embodiment, the Final Inducement Level is reached when the DEF level reaches 0% and any of the following three conditions are met: (1) the ignition key is cycled through the off position for any amount of time; (2) the vehicle has been continuously stationary for 1 hour; or (3) the fuel level has been re-filled (e.g., by at least 15% of total fuel capacity) without filling the DEF tank(s) to a level that will reset the de-rate level. These conditions can be used to ensure safe operating conditions, but are not required in all situations. For example, emergency vehicles may be exempt from triggering a "Final Inducement" stage when refueling (see condition (3), above).

Figure 11:

Final Inducement Level notifications may include, for example, a flashing DEF symbol, a check-engine lamp or symbol, a stop-engine lamp or symbol, and/or a display message. FIG. 11 shows an example Final Inducement Level notification presented as a pop-up display message 1106 on a graphical display. The DEF symbol 920 (which may be flashing) is displayed along with text that informs the operator of the active de-rate (e.g., "Limp Home Mode—Maximum De-rate") and instructions as to how to resolve the de-rate cause (e.g., "Must Add Diesel Exhaust Fluid").

De-rate levels can be reset when DEF is added. For example, a reset to Level 0 from any other de-rate level can occur when DEF capacity is returned to 22.5% above empty.

As another example, adding a smaller amount of DEF can result in a reset from a higher de-rate level to a lower de-rate level (e.g., from Level 4 to Level 2).

In at least one embodiment, because the reason for the de-rate is regulatory, an initial de-rate level for low DEF level is set at Level 2, and Level 4 is set as the next and final level in the progression of de-rate levels. In such an embodiment, Level 4 can correspond to the Final Inducement Level described above, and other possible de-rate levels described herein (e.g., Level 1, Level 3) can be skipped.

DEF Quality and SCR Fault/Tampering Notifications and De-Rates

In this detailed example, measurements of time and/or distance after detection of low-quality DEF and/or SCR system tampering or faults (e.g., disconnected DEF level sensor, blocked line or dosing valve, disconnected dosing valve, disconnected pump, disconnected wiring harness, disconnected $NO_X$ sensor, disconnected quality sensor, disconnected exhaust temperature sensor, or disconnected DEF temperature sensor) are associated with corresponding de-rate levels.

At Level 0 for DEF quality, the DEF quality is within normal limits (e.g., meeting requirements set by the EPA) and no notification is given. At Level 0 for SCR fault/tampering, no tampering or faults have been detected and no notification is given. Each of the other levels tracks a period of time (T) and/or mileage (D) after an initial detection of poor DEF quality or an SCR fault or tampering, respectively. (Mileage can be tracked as a function of time by multiplying T by a vehicle speed, which may be an average speed measured in real time or a default speed (e.g., 50 mph)). In general, the urgency of operator notifications and the severity of de-rates tend to increase as T and/or D increases. However, many exceptions and alternatives are possible. For example, emergency vehicles (e.g., fire trucks, ambulances, and the like) may be exempt from de-rates associated with de-rate levels (e.g., Level 2, described below).

Figure 12:
Figure 13:
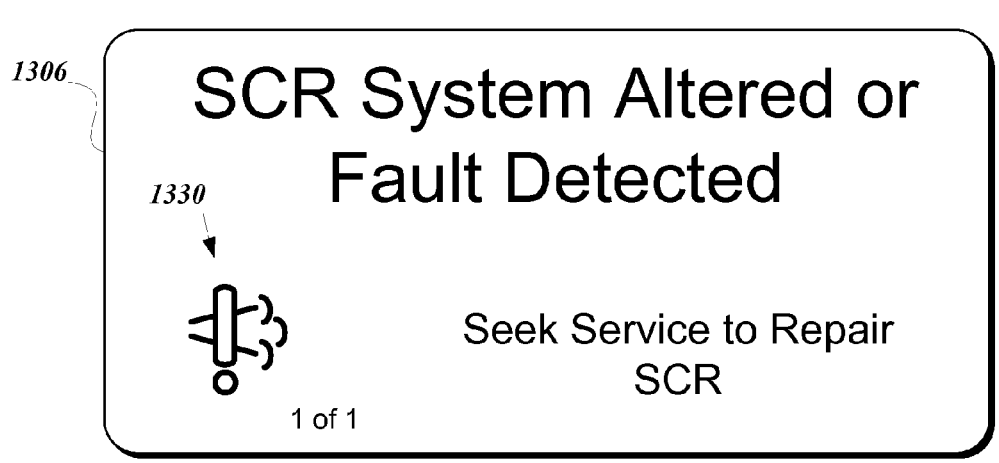

At Level 1, a notification is given but no de-rate is active. The notification may include, for example, a DEF lamp or symbol, a check-engine lamp or symbol, and/or a display message. FIGS. 12 and 13 show example Level 1 notifications presented as pop-up display messages 1206, 1306 on a graphical display. In FIG. 12, a DEF symbol 920 is displayed, and in FIG. 13, an emissions de-rate symbol 1330 is displayed. The symbols 920, 1330 are displayed in the respective display messages 1206, 1306 along with corresponding text that provides information on the reason for the notification (e.g., "Diesel Exhaust Fluid Poor Quality," "SCR System Altered or Fault Detected") and information relating to how a de-rate can be prevented from taking effect (e.g., "Replace with New DEF to Prevent De-rate," "Seek Service to Repair SCR").

Figure 14:
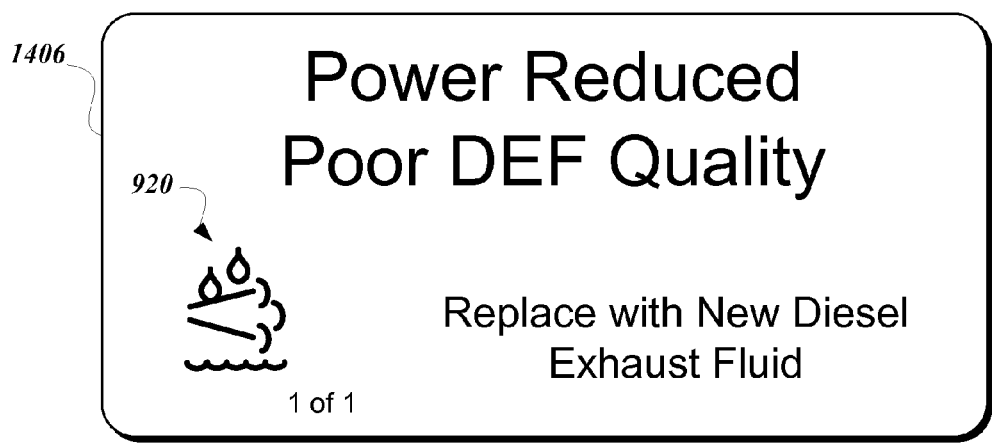
Figure 15:
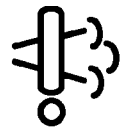

Once the de-rate cause has been detected, time (T) and mileage (D) tracking begins in order to determine whether further de-rate levels are reached. In Levels 2 and 3, notifications are given and de-rates are activated when D or T reaches a threshold value. The notifications may include, for example, a flashing DEF lamp or symbol, a check-engine lamp or symbol, and/or a display message. FIGS. 14 and 15 show example Level 2 or Level 3 notifications presented as pop-up display messages 1406, 1506 on a graphical display. In FIG. 14, a DEF symbol 920 is displayed, and in FIG. 15, an emissions de-rate symbol 1330 is displayed. The symbols 920, 1330 are displayed in the respective display messages 1406, 1506 along with corresponding text that provides de-rate information (e.g., "Power Reduced Poor DEF Quality," "Power Reduced Due to SCR System Fault") and instructions for resolving the problematic condition, which can lead to deactivating the de-rate (e.g., "Replace with New Diesel Exhaust Fluid," "Seek Service to Repair SCR").

At a Final Inducement Level, a notification is provided, a de-rate is active, and vehicle speed is limited. In at least one embodiment, the Final Inducement Level is reached when T or D reaches the corresponding threshold value for this level and any of the following three conditions are met: (1) the ignition key is cycled through the off position for any amount of time; (2) the vehicle has been continuously stationary for 1 hour; or (3) the fuel level has been re-filled (e.g., by at least 15% of total fuel capacity) without filling the DEF tank(s) to a level that will reset the de-rate level. These conditions can be used to ensure safe operating conditions, but are not required in all situations. For example, emergency vehicles may be exempt from triggering a "Final Inducement" stage when refueling (see condition (3), above).

Figure 16:
Figure 17:

Final Inducement Level notifications may include, for example, a flashing DEF symbol, a check-engine lamp or symbol, a stop-engine lamp or symbol, and/or a display message. FIGS. 16 and 17 show example Final Inducement Level notifications presented as pop-up display messages 1606, 1706 on a graphical display. In FIG. 16, a DEF symbol 920 is displayed, and in FIG. 17, an emissions de-rate symbol 1330 is displayed. The symbols 920, 1330 are displayed in the respective display messages 1606 and 1706 along with corresponding text that provides de-rate information (e.g., "Limp Home Mode—Maximum De-rate") and instructions for resolving the problematic condition, which can lead to deactivating the de-rate (e.g., "Must Replace Diesel Exhaust Fluid," "Repair SCR System").

DEF quality and SCR fault/tampering de-rate levels can be reset when a detected condition is resolved. For example, a reset to Level 0 from any other level can occur when a detected condition is resolved. However, immediate return to a higher level (e.g., Level 3) can occur when a previously detected fault occurs again within a designated time period (e.g., 40 hours of vehicle operating time). In some cases, the vehicle may require service at a service center to clear a fault.

In at least one embodiment, because the reason for the de-rate is regulatory, an initial de-rate level for poor DEF quality or SCR fault is set at Level 2, and Level 4 is set as the next and final level in the progression. In such an embodiment, Level 4 can correspond to the Final Inducement Level described above, and other possible de-rate levels described herein (e.g., Level 1, Level 3) can be skipped.

Example Threshold Values for DEF/SCR De-Rate Levels

Example threshold DEF levels (variable name VDEF), threshold time and distance values after detection of poor DEF quality (variable names TDEF-Quality and DDEF-Quality, respectively), and threshold time and distance values after detection of SCR faults/tampering (variable names TSCR-Fault and DSCR-Fault, respectively) are shown in Tables 7 and 8, below. In Tables 7 and 8, the "Min" and "Max" values represent an example range within which the respective levels or limits could be set by original equipment manufacturers (OEMs), and the "Default" value represents a default or recommended value. However, these values can vary depending on factors such as OEM requirements, vehicle safety rules, and EPA guidelines. Table 8 reflects differences in treatment of emergency vehicles, such as exemptions from some de-rate levels or conditions that trigger de-rate levels (indicated as "not used" in the table). For example, distance thresholds can be ignored for emergency vehicles. Table 8 also reflects variation in values (e.g., DEF levels and time limits) that trigger corresponding de-rate values. For example, time limits corresponding to DEF quality and SCR fault/tampering for some de-rate levels are higher for emergency vehicles than for non-emergency vehicles.

TABLE 7

DEF/SCR threshold values (non-emergency vehicles)

| Variable Name | Min | Max | Default |
|---|---|---|---|
| $V_{DEF-Level1}$ (% tank level) | 10% | 60% | 15% |
| $V_{DEF-Level2}$ (% tank level) | 5% | 55% | 10% |
| $V_{DEF-Level3}$ (% tank level) | 2.5% | 50% | 5% |
| $V_{DEF-Level4}$ (% tank level) | 0% | 45% | 0% |
| $V_{DEF-Final}$ (% tank level) | 0% | 45% | 0% |
| $D_{DEF-Quality-Stage2}$ (miles) | 0 | 50 | 50 |
| $D_{DEF-Quality-Stage3}$ (miles) | 0 | 150 | 150 |
| $D_{DEF-Quality-Final}$ (miles) | 0 | 150 | 150 |
| $T_{DEF-Quality-Stage2}$ (hours) | 0 | 1 | 1 |
| $T_{DEF-Quality-Stage3}$ (hours) | 0 | 3 | 3 |
| $T_{DEF-Quality-Final}$ (hours) | 0 | 3 | 3 |
| $D_{SCR-Fault-Stage2}$ (miles) | 0 | 50 | 50 |
| $D_{SCR-Fault-Stage3}$ (miles) | 50 | 250 | 200 |
| $D_{SCR-Fault-Final}$ (miles) | 50 | 250 | 200 |
| $T_{SCR-Fault-Stage2}$ (hours) | 0 | 1 | 1 |
| $T_{SCR-Fault-Stage3}$ (hours) | 1 | 5 | 4 |
| $T_{SCR-Fault-Final}$ (hours) | 1 | 5 | 4 |

TABLE 8

DEF/SCR threshold values (emergency vehicles)

| Variable Name | Min | Max | Default |
|---|---|---|---|
| $V_{DEF-Level1}$ (% tank level) | 15% | 60% | 15% |
| $V_{DEF-Level2}$ (% tank level) | 10% | 55% | 10% |
| $V_{DEF-Level3}$ (% tank level) | 5% | 50% | 5% |
| $V_{DEF-Level4}$ (% tank level) | not used | not used | not used |
| $V_{DEF-Final}$ (% tank level) | 0% | 45% | 0% |
| $D_{DEF-Quality-Stage2}$ (miles) | not used | not used | not used |
| $D_{DEF-Quality-Stage3}$ (miles) | not used | not used | not used |
| $D_{DEF-Quality-Final}$ (miles) | not used | not used | not used |
| $T_{DEF-Quality-Stage2}$ (hours) | not used | not used | not used |
| $T_{DEF-Quality-Stage3}$ (hours) | 0 | 10 | 10 |
| $T_{DEF-Quality-Final}$ (hours) | 0 | 20 | 20 |
| $D_{SCR-Fault-Stage2}$ (miles) | not used | not used | not used |
| $D_{SCR-Fault-Stage3}$ (miles) | not used | not used | not used |
| $D_{SCR-Fault-Final}$ (miles) | not used | not used | not used |
| $T_{SCR-Fault-Stage2}$ (hours) | not used | not used | not used |
| $T_{SCR-Fault-Stage3}$ (hours) | 0 | 10 | 10 |
| $T_{SCR-Fault-Final}$ (hours) | 0 | 40 | 40 |

Example de-rate values corresponding to DEF level (variable name $Derate_{DEF-L}$), DEF quality (variable name $Derate_{DEF-Q}$), and SCR fault/tampering (variable name $Derate_{SCR-F}$) are shown in Tables 9 and 10, below. In Tables 9 and 10, the engine torque de-rate values (percentage reduction in engine power) and "Vmax" values (maximum vehicle speed) represent examples for the respective de-rate levels. However, these values can vary depending on factors such as OEM requirements, vehicle safety rules, and EPA guidelines. Table 10 reflects differences in treatment of emergency vehicles, such as exemptions from some de-rate levels (indicated as "not used" in the table). Table 10 also reflects variation of values that correspond to de-rate levels. For example, Vmax values apply to more de-rate levels for emergency vehicles than for non-emergency vehicles, and Vmax values are higher for emergency vehicles than for non-emergency vehicles.

TABLE 9

DEF/SCR de-rate values (non-emergency vehicles)

| Variable Name | Engine Torque De-rate Value | Vmax |
|---|---|---|
| $Derate_{DEF-L-Stage1}$ | 0% | none |
| $Derate_{DEF-L-Stage2}$ | 0% | none |
| $Derate_{DEF-L-Stage3}$ | 25% | none |
| $Derate_{DEF-L-Stage4}$ | 40% | none |
| $Derate_{DEF-L-Final}$ | 40% | 5 mph |
| $Derate_{DEF-Q-Stage1}$ | 0% | none |
| $Derate_{DEF-Q-Stage2}$ | 25% | none |
| $Derate_{DEF-Q-Stage3}$ | 40% | none |
| $Derate_{DEF-Q-Final}$ | 40% | 5 mph |
| $Derate_{SCR-F-Stage1}$ | 0% | none |
| $Derate_{SCR-F-Stage2}$ | 25% | none |
| $Derate_{SCR-F-Stage3}$ | 40% | none |
| $Derate_{SCR-F-Final}$ | 40% | 5 mph |

TABLE 10

DEF/SCR de-rate values (emergency vehicles)

| Variable Name | Engine Torque De-rate Value | Vmax |
|---|---|---|
| $Derate_{DEF-L-Stage1}$ | none | none |
| $Derate_{DEF-L-Stage2}$ | none | none |
| $Derate_{DEF-L-Stage3}$ | none | not used |
| $Derate_{DEF-L-Stage4}$ | not used | 55 mph |
| $Derate_{DEF-L-Final}$ | none | 25 mph |
| $Derate_{DEF-Q-Stage1}$ | none | none |
| $Derate_{DEF-Q-Stage2}$ | not used | not used |
| $Derate_{DEF-Q-Stage3}$ | none | 55 mph |
| $Derate_{DEF-Q-Final}$ | none | 25 mph |
| $Derate_{SCR-F-Stage1}$ | none | none |
| $Derate_{SCR-F-Stage2}$ | not used | not used |
| $Derate_{SCR-F-Stage3}$ | none | 55 mph |
| $Derate_{SCR-F-Final}$ | none | 25 mph |

Example Methods

Figure 18:
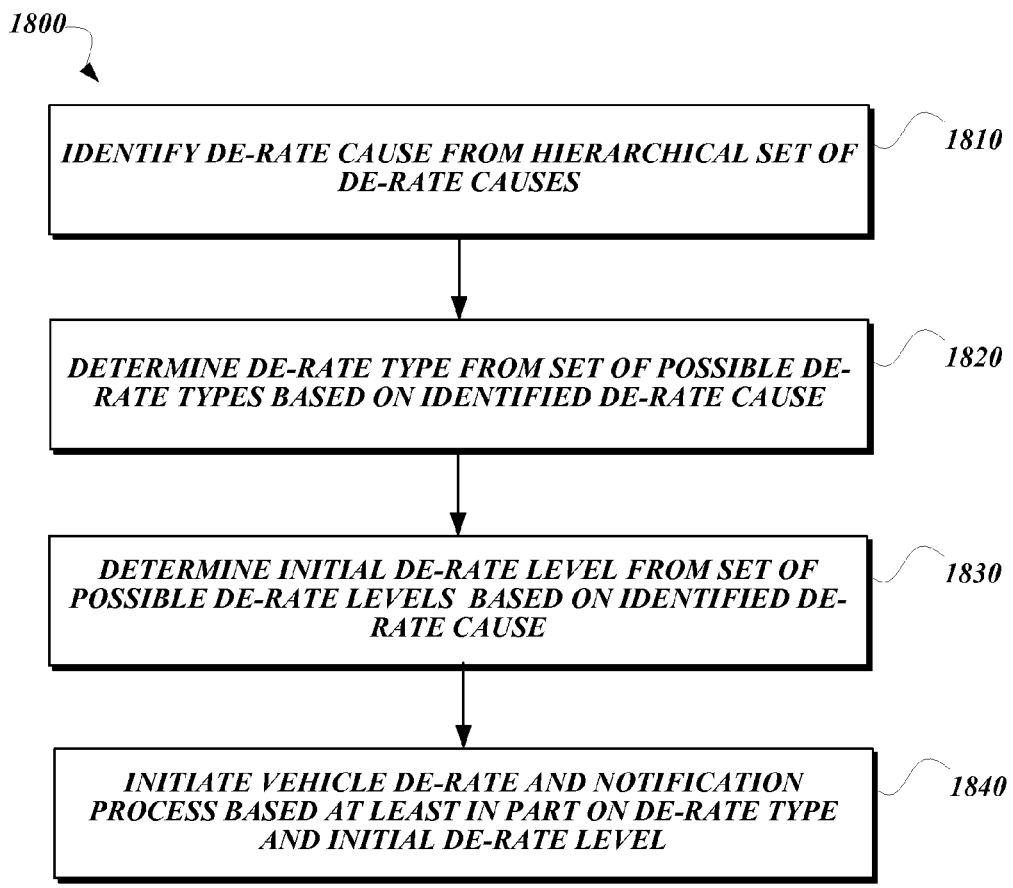
FIGS. 18-21 show flow diagrams of illustrative methods that may be implemented by a computing system such as the on-board vehicle computing system of FIG. 1.

FIG. 18 is a flow diagram of an illustrative method 1800 that may be implemented by the hierarchical vehicle de-rate and notification system 100 described above, or by some other system. In step 1810, the system identifies a de-rate cause in a hierarchical set of de-rate causes. For example, the system may identify a de-rate cause as being in a safety category that is prioritized above other categories (e.g., durability). In step 1820, the system selects a de-rate type from a set of possible de-rate types based on the identified de-rate cause. For example, the system may select an engine torque de-rate type instead of vehicle speed or engine speed de-rate types based on a determination that engine torque is the designated de-rate type for the identified de-rate cause. In practice, the selected de-rate type also may depend on other factors, such as an initial de-rate level. For example, an engine torque de-rate and a vehicle speed de-rate may both be associated with the identified de-rate cause, but the initial de-rate level for the de-rate cause may only include an engine torque de-rate, with the vehicle speed de-rate being active only at higher de-rate levels.

In step 1830, the system selects an initial de-rate level from a set of possible de-rate levels based on the identified de-rate cause. For example, the system may select Level 4 as an initial de-rate level based on a determination that the de-rate cause is categorized as being safety-related, or the system may select Level 1 as an initial de-rate level if the de-rate cause is categorized as being durability-related. In step 1840, the system initiates a vehicle de-rate and notification process based at least in part on the de-rate type and the initial de-rate level. For example, if the initial de-rate level specifies a notification with no active de-rate, the system may initiate the process by providing the notification. As another example, if the initial de-rate level specifies a notification and an active engine torque de-rate, the system may initiate the process by providing the notification and activating an engine torque de-rate. The de-rate level can change (e.g., by advancing to progressively higher de-rates) based on changes in vehicle conditions underlying the identified de-rate cause.

Figure 19:
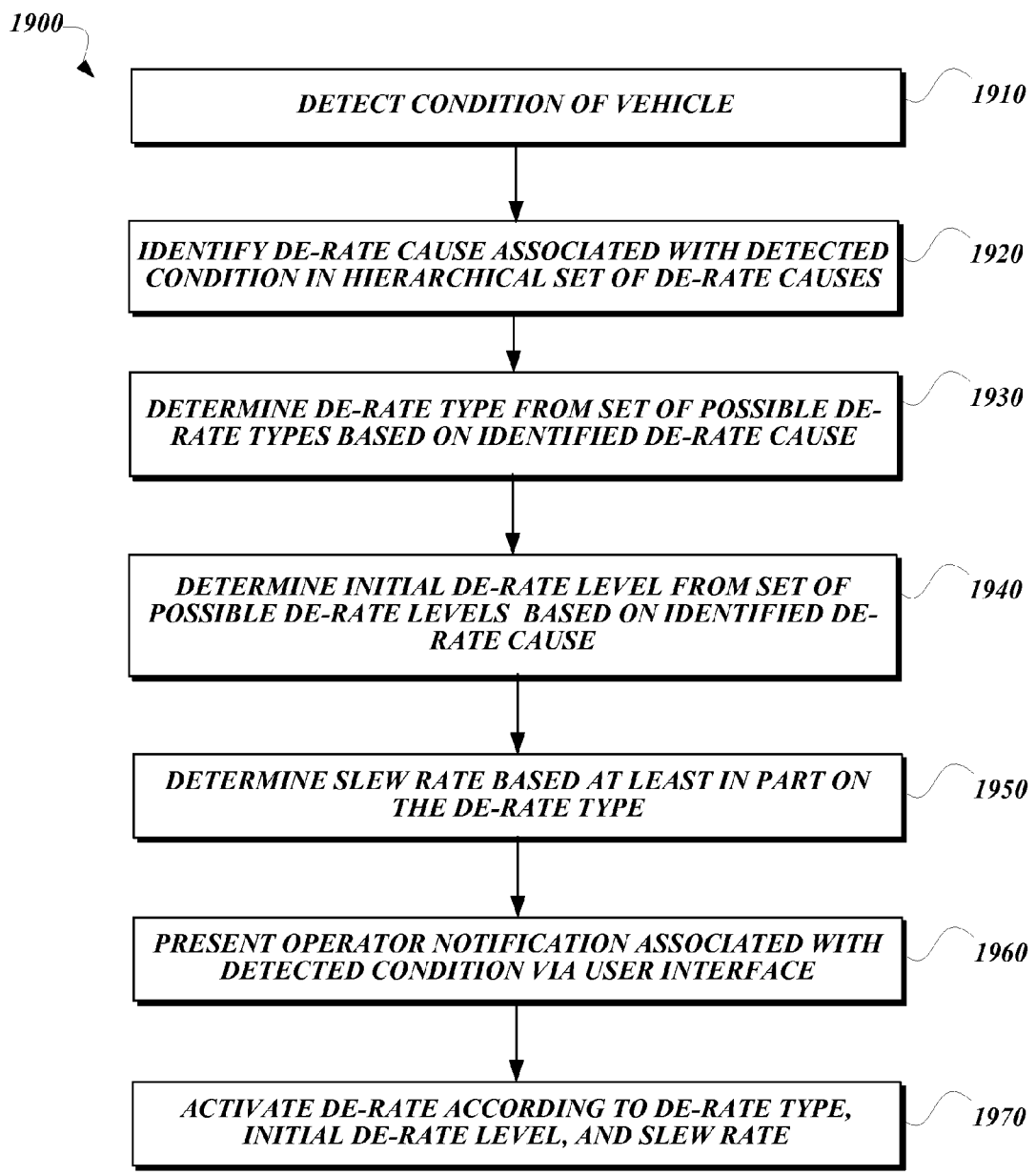

FIG. 19 is a flow diagram of another illustrative method 1900 that may be implemented by the hierarchical vehicle de-rate and notification system 100 described above, or by some other system. In step 1910, the system detects a condition of a vehicle. In step 1920, the system identifies a de-rate cause associated with the detected condition in a hierarchical set of de-rate causes. In step 1930, the system selects a de-rate type from a set of possible de-rate types based on the identified de-rate cause. In step 1940, the system selects an initial de-rate level of possible de-rate levels based on the identified de-rate cause. In step 1950, the system determines a slew rate based at least in part on the de-rate type. For example, if the de-rate type is engine torque, the system can determine a slew rate for reducing engine torque based on a maximum de-rate percentage, as shown in FIG. 2. In step 1960, the system presents an operator notification associated with the vehicle condition at an operator interface. For example, the system can present a display message on a graphical display that indicates the de-rate type and instructions for resolving the underlying vehicle condition. In step 1970, the system activates a de-rate according to the de-rate type, the initial de-rate level, and the slew rate.

Figure 20:
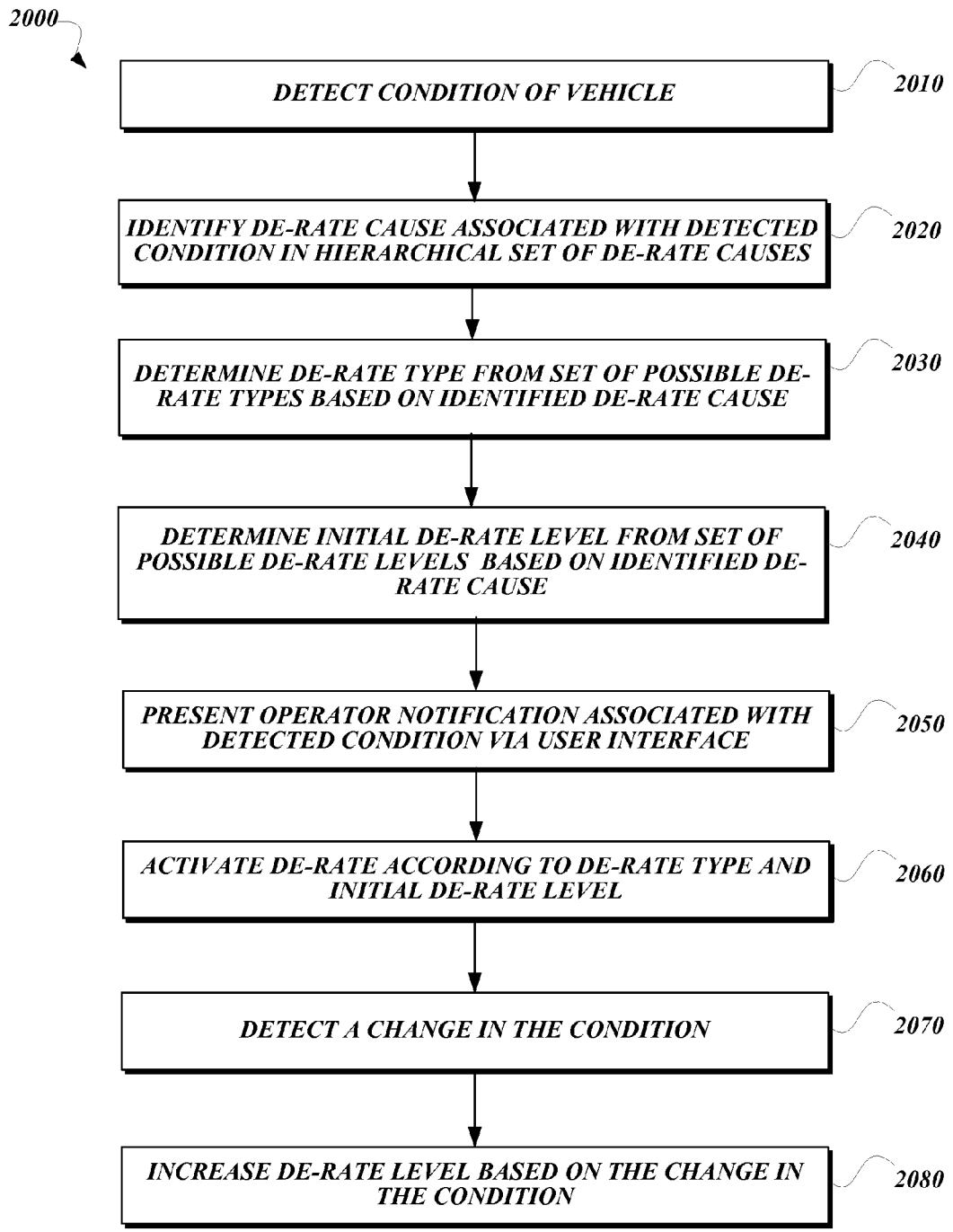

FIG. 20 is a flow diagram of another illustrative method 2000 that may be implemented by the hierarchical vehicle de-rate and notification system 100 described above, or by some other system. In step 2010, the system detects a condition of a vehicle. In step 2020, the system identifies a de-rate cause associated with the detected condition in a hierarchical set of de-rate causes. In step 2030, the system selects a de-rate type from a set of possible de-rate types based on the identified de-rate cause. In step 2040, the system selects an initial de-rate level of possible de-rate levels based on the identified de-rate cause. In step 2050, the system presents an operator notification associated with the vehicle condition via an operator interface. In step 2060, the system activates a according to the de-rate type and the initial de-rate level. In step 2070, the system detects a change in the vehicle condition. In step 2080, the system increases the de-rate level based on the change in the vehicle condition. For example, the system may determine that the vehicle condition has become more problematic (e.g., a value may have increased above a threshold level) and may increase the de-rate level to a more severe de-rate based on the change in the vehicle condition.

Figure 21:
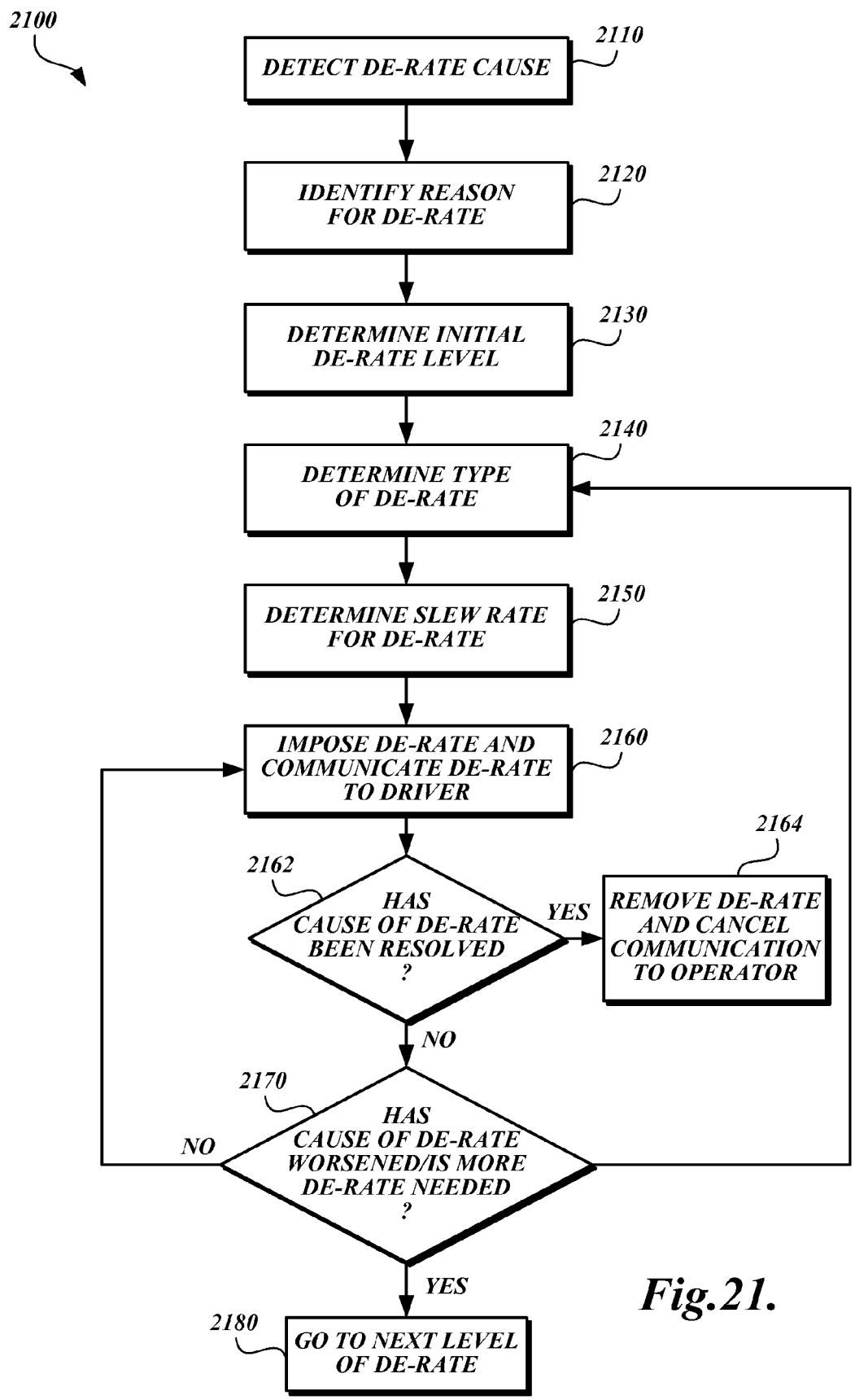

FIG. 21 is a flow diagram of another illustrative method 2100 that may be implemented by the hierarchical vehicle de-rate and notification system 100 described above, or by some other system. In step 2110, the system detects a de-rate cause, and in step 2120 the system identifies a reason for the corresponding de-rate. In step 2130, the system determines an initial de-rate level. In step 2140, the system determines a de-rate type. In step 2150, the system determines a slew rate. In step 2160, the system imposes a de-rate and communicates de-rate information to the driver of the vehicle. At decision block 2162, the system determines whether the de-rate cause has been resolved. If so, the system removes (deactivates) the de-rate and cancels the communication of the de-rate information to the operator in step 2164. If not, the system determines, in decision block 2170, whether the cause of the de-rate has worsened and whether a higher de-rate level is to be applied. If so, the system advances the de-rate to the next de-rate level in step 2180. If not, the system returns to step 2160 and continues to impose the de-rate at the initial de-rate level and communicate the de-rate information to the driver.

Many alternatives to the described methods are possible. Processing stages in the various methods can be separated into additional stages or combined into fewer stages. For example, a de-rate cause may be stored in a data record along a corresponding category of the de-rate cause, an initial de-rate level, a de-rate type, and/or other information. By accessing such a data record, a system may be able to retrieve multiple types of such information in a single step, rather than in multiple steps. Processing stages in the various methods also can be omitted or supplemented with other methods or processing stages. Furthermore, processing stages that are described as occurring in a particular order can instead occur in a different order and/or in a parallel fashion, with multiple components or software processes concurrently handling one or more of the illustrated processing stages. As another example, processing stages that are indicated as being performed by a particular device or module may instead be performed by one or more other devices or modules.

Extensions and Alternatives

Many alternatives to the de-rate levels described herein and their corresponding notification and effects are possible. For example, different vehicles may have different features (e.g., interactive user interfaces, telltales, and the like) that can be used to convey different types of warnings or other information. As another example, notifications can be used to warn or induce action by drivers to address vehicle conditions that differ from those described herein. As another example, notifications can be configured depending on vehicle type, vehicle status, vehicle operator/owner preferences, or other factors. As another example, different performance effects may be applied to vehicles depending on vehicle type, vehicle features, vehicle status, or other factors. As another example, notifications and effects associated with example de-rate levels described herein can be omitted, supplemented with additional notifications or effects, or replaced with different notifications or effects. As another example, de-rate levels can be triggered by detected vehicle conditions (e.g., by sensor readings) that differ from those described herein. As another example, de-rate levels described herein can be omitted, supplemented with additional de-rate levels, or replaced with different de-rate levels to provide, for example, different granularity of warnings and inducements (e.g., by making warnings and performance effects more abrupt or more gradual, as may be desired in different situations). Other de-rate levels, if present, can be incorporated into a hierarchical vehicle de-rate system.

Although de-rates are described herein as being imposed for particular reasons and categorized in accordance with those reasons, de-rates may be imposed for other reasons. Other reasons for de-rates, if present, can be incorporated into a hierarchical vehicle de-rate and notification system and used in accordance with principles described herein. Similarly, de-rate types, de-rate causes and related vehicle conditions that differ from those described herein can be incorporated into a hierarchical vehicle de-rate and notification system and used in accordance with principles described herein.

Although some of the de-rate causes and other details described herein may not apply to some types of vehicles, it should be understood that aspects of the hierarchical de-rate and notification system and related techniques described herein transcend any particular type of vehicle employing an internal combustion engine (e.g., gas, diesel, etc.), hybrid drive train, or electric motor.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A computer-implemented method comprising:
   detecting a vehicle condition associated with a first sensor module of a vehicle;
   identifying a de-rate cause associated with the detected vehicle condition and the first sensor module of the vehicle in a hierarchical set of possible de-rate causes, wherein the hierarchical set of possible de-rate causes comprises oil temperature too high, fuel temperature too high, coolant temperature too high, turbo speed too high, exhaust pressure too high, inlet air pressure too high, inlet air pressure too low, inlet air temperature too high, diesel exhaust fluid (DEF) level too low, poor DEF quality, selective catalytic reduction (SCR) system fault, oil pressure too low, and exhaust temperature too high,
   wherein each of the oil temperature, coolant temperature, turbo speed, exhaust pressure, and inlet air pressure de-rate causes has a first initial de-rate level and a progression of one or more additional de-rate levels that specify an operator notification and an active engine torque de-rate;
   wherein the fuel temperature de-rate cause has the first initial de-rate level and a progression of one or more additional de-rate levels that specify an operator notification, an active engine torque de-rate, and an active engine speed de-rate;
   wherein each of the inlet air temperature, DEF level, DEF quality, and SCR system fault de-rate causes has a second initial de-rate level that differs from the first initial de-rate level and a progression of one or more additional de-rate levels that specify an operator notification and an active engine torque de-rate;
   wherein the one or more additional de-rate levels for each of the DEF level, DEF quality, and SCR system fault de-rate causes further specify an active vehicle speed de-rate that sets a maximum vehicle speed;
   wherein activation of the vehicle speed de-rate for the DEF quality and SCR system fault de-rate causes is based at least in part on time and mileage since detection of poor DEF quality or detection of the SCR system fault, respectively;
   wherein the oil pressure de-rate cause has a third initial de-rate level that differs from the first and second initial de-rate levels and specifies an operator notification and an active de-rate and a progression of one or more additional de-rate levels that specify an operator notification, an active engine torque de-rate, an active engine speed de-rate, and a shutdown level; and
   wherein the exhaust temperature de-rate cause has a fourth initial de-rate level that differs from the first, second, and third initial de-rate levels and specifies an operator notification and an active de-rate and a progression of one or more additional de-rate levels that specify an operator notification, an active engine torque de-rate, an active engine speed de-rate, and a shutdown level;
   selecting a de-rate type based at least in part on the identified de-rate cause; and
   initiating a vehicle de-rate and notification process based at least in part on the de-rate type and the initial de-rate level of the identified de-rate cause.

2. The computer-implemented method of claim 1, wherein the vehicle de-rate and notification process comprises activating a vehicle de-rate having the de-rate type and the initial de-rate level of the identified de-rate cause.

3. The computer-implemented method of claim 2, wherein the de-rate type is selected from a group consisting of: vehicle speed, engine torque, engine speed, and shutdown.

4. The computer-implemented method of claim 2, further comprising:
   determining a slew rate for the vehicle de-rate; and
   imposing the vehicle de-rate to affect vehicle performance according to the slew rate.

5. The computer-implemented method of claim 1, further comprising presenting an operator notification associated with the identified de-rate cause via an operator interface.

6. The computer-implemented method of claim 1, wherein the hierarchical set comprises categories of de-rate causes, wherein the categories are based at least in part on a primary reason for each of the respective possible de-rate causes, and wherein the categories include one or more of durability, pre-failure durability, post-failure durability, regulatory, and safety.

7. The computer-implemented method of claim 1, wherein the vehicle de-rate and notification process comprises:
   determining a change in the detected vehicle condition associated with the identified de-rate cause; and
   activating at least one of the additional de-rate levels based on the change in the detected vehicle condition.

8. The computer-implemented method of claim 1, wherein the vehicle de-rate and notification process comprises:
   determining a change in the detected vehicle condition associated with the identified de-rate cause; and
   deactivating a vehicle de-rate based on the change in the detected vehicle condition.

9. The computer-implemented method of claim 5, wherein the presented operator notification comprises information about at least one of the de-rate type and the detected vehicle condition.

10. The computer-implemented method of claim 5, wherein the presented operator notification comprises a shutdown timer.

11. The computer-implemented method of claim 4, wherein the de-rate type is selected from a group consisting of: engine torque, engine speed, vehicle speed, and shutdown, and wherein the slew rate is based at least in part on the selected de-rate type.

12. The computer-implemented method of claim 4, wherein imposing the de-rate comprises applying a reduced maximum engine torque value to the vehicle, and wherein the slew rate comprises a rate of change that depends on the reduced maximum engine torque value.

13. An on-board vehicle computer system comprising:
at least one processing unit; and
a memory having therein computer-executable instructions configured to cause the on-board vehicle computer system to perform steps comprising:
detect a vehicle condition associated with a first sensor module of a vehicle;
identify a de-rate cause for the vehicle in a hierarchical set of de-rate causes, wherein the identified de-rate cause is associated with the vehicle condition and the first sensor module of the vehicle, and wherein the hierarchical set of possible de-rate causes comprises oil temperature too high, fuel temperature too high, coolant temperature too high, turbo speed too high, exhaust pressure too high, inlet air pressure too high, inlet air pressure too low, inlet air temperature too high, diesel exhaust fluid (DEF) level too low, poor DEF quality, selective catalytic reduction (SCR) system fault, oil pressure too low, and exhaust temperature too high,
wherein each of the oil temperature, coolant temperature, turbo speed, exhaust pressure, and inlet air pressure de-rate causes has a first initial de-rate level and a progression of one or more additional de-rate levels that specify an operator notification and an active engine torque de-rate;
wherein the fuel temperature de-rate cause has the first initial de-rate level and a progression of one or more additional de-rate levels that specify an operator notification, an active engine torque de-rate, and an active engine speed de-rate;
wherein each of the inlet air temperature, DEF level, DEF quality, and SCR system fault de-rate causes has a second initial de-rate level that differs from the first initial de-rate level and a progression of one or more additional de-rate levels that specify an operator notification and an active engine torque de-rate;
wherein the one or more additional de-rate levels for each of the DEF level, DEF quality, and SCR system fault de-rate causes further specify an active vehicle speed de-rate that sets a maximum vehicle speed;
wherein activation of the vehicle speed de-rate for the DEF quality and SCR system fault de-rate causes is based at least in part on time and mileage since detection of poor DEF quality or detection of the SCR system fault, respectively;
wherein the oil pressure de-rate cause has a third initial de-rate level that differs from the first and second initial de-rate levels and specifies an operator notification and an active de-rate and a progression of one or more additional de-rate levels that specify an operator notification, an active engine torque de-rate, an active engine speed de-rate, and a shutdown level; and
wherein the exhaust temperature de-rate cause has a fourth initial de-rate level that differs from the first, second, and third initial de-rate levels and specifies an operator notification and an active de-rate and a progression of one or more additional de-rate levels that specify an operator notification, an active engine torque de-rate, an active engine speed de-rate, and a shutdown level;
select a de-rate type from a set of possible de-rate types based at least in part on the identified de-rate cause;
present an operator notification associated with the identified de-rate cause via an operator interface;
activate a de-rate for the vehicle according to the de-rate type and the initial de-rate level of the identified de-rate cause if the initial de-rate level of the identified de-rate cause specifies an active de-rate;
detect a change in the vehicle condition; and
select an updated de-rate level based at least in part on the change in the vehicle condition.

14. The computer-implemented method of claim 1, wherein the first initial de-rate level specifies a notification with no active de-rate, and wherein the second initial de-rate level specifies a notification and an active de-rate.

15. A computer system comprising:
at least one processing unit; and
a memory having therein computer-executable instructions configured to cause the computer system to perform steps comprising:
detect a vehicle condition associated with a first sensor module of a vehicle;
identify a de-rate cause for the vehicle in a hierarchical set of de-rate causes, wherein the identified de-rate cause is associated with the vehicle condition and the first sensor module of the vehicle, and wherein the hierarchical set of possible de-rate causes comprises oil temperature too high, fuel temperature too high, coolant temperature too high, turbo speed too high, exhaust pressure too high, inlet air pressure too high, inlet air pressure too low, inlet air temperature too high, diesel exhaust fluid (DEF) level too low, poor DEF quality, selective catalytic reduction (SCR) system fault, oil pressure too low, and exhaust temperature too high,
wherein each of the oil temperature, coolant temperature, turbo speed, exhaust pressure, and inlet air pressure de-rate causes has a first initial de-rate level and a progression of one or more additional de-rate levels that specify an operator notification and an active engine torque de-rate;
wherein the fuel temperature de-rate cause has the first initial de-rate level and a progression of one or more additional de-rate levels that specify an operator notification, an active engine torque de-rate, and an active engine speed de-rate;
wherein each of the inlet air temperature, DEF level, DEF quality, and SCR system fault de-rate causes has a second initial de-rate level that differs from the first initial de-rate level and a progression of one or more additional de-rate levels that specify an operator notification and an active engine torque de-rate;
wherein the one or more additional de-rate levels for each of the DEF level, DEF quality, and SCR system fault de-rate causes further specify an active vehicle speed de-rate that sets a maximum vehicle speed;
wherein activation of the vehicle speed de-rate for the DEF quality and SCR system fault de-rate causes is based at least in part on time and mileage since detection of poor DEF quality or detection of the SCR system fault, respectively;
wherein the oil pressure de-rate cause has a third initial de-rate level that differs from the first and second initial de-rate levels and specifies an operator notification and an active de-rate and a progression of one or more additional de-rate levels that specify an operator notification, an active engine torque de-rate, an active engine speed de-rate, and a shutdown level; and wherein the exhaust temperature de-rate cause has a fourth initial de-rate level that differs from the first, second, and third initial de-rate levels and specifies an operator notification and an active de-rate and a progression of one or more additional de-rate levels that specify an operator notification, an active engine torque de-rate, an active engine speed de-rate, and a shutdown level;

select a de-rate type based at least in part on the identified de-rate cause; and initiate a vehicle de-rate and notification process based at least in part on the de-rate type and the initial de-rate level of the identified de-rate cause.

16. The computer system of claim 15, wherein the vehicle de-rate and notification process comprises activating a vehicle de-rate having the de-rate type and the initial de-rate level of the identified de-rate cause.

17. The computer system of claim 15, wherein the de-rate type is selected from a group consisting of: vehicle speed, engine torque, engine speed, and shutdown.

18. The computer system of claim 15, wherein the computer-executable instructions are further configured to cause the computer system to present an operator notification associated with the identified de-rate cause via an operator interface.

19. The computer system of claim 15, wherein the vehicle de-rate and notification process comprises:
   determining a change in the detected vehicle condition associated with the identified de-rate cause; and
   activating at least one of the additional de-rate levels based on the change in the detected vehicle condition.

20. The computer system of claim 15, wherein the vehicle de-rate and notification process comprises:
   determining a change in the detected vehicle condition associated with the identified de-rate cause; and
   deactivating a vehicle de-rate based on the change in the detected vehicle condition.

21. The computer system of claim 15, wherein the first initial de-rate level specifies a notification with no active de-rate, and wherein the second initial de-rate level specifies a notification and an active de-rate.

22. The computer system of claim 15, wherein the computer system is an on-board vehicle computer system.

* * * * *